United States Patent
Schmidt et al.

(10) Patent No.: US 8,977,309 B2
(45) Date of Patent: Mar. 10, 2015

(54) ANTENNA ARRAY, NETWORK PLANNING SYSTEM, COMMUNICATION NETWORK AND METHOD FOR RELAYING RADIO SIGNALS WITH INDEPENDENTLY CONFIGURABLE BEAM PATTERN SHAPES USING A LOCAL KNOWLEDGE

(75) Inventors: Georg Schmidt, Laichingen (DE); Martin Weckerle, Ulm (DE); Johannes Schlee, Ulm (DE); Dirk Neumann, Ulm (DE); Johannes Fuchs, Vohringen (DE)

(73) Assignee: Kathrein-Werke KG, Rosenheim (DE)

( * ) Notice: Subject to any disclaimer, the term of this patent is extended or adjusted under 35 U.S.C. 154(b) by 1148 days.

(21) Appl. No.: 12/563,693

(22) Filed: Sep. 21, 2009

(65) Prior Publication Data
US 2011/0069633 A1 Mar. 24, 2011

(51) Int. Cl.
*H04M 1/00* (2006.01)
*H04B 7/04* (2006.01)
(Continued)

(52) U.S. Cl.
CPC ............ *H04B 7/0408* (2013.01); *H01Q 1/246* (2013.01); *H04L 25/03343* (2013.01); *H04L 2025/03426* (2013.01); *H04L 2025/03808* (2013.01); *H04W 16/28* (2013.01)
USPC ............................ 455/507; 370/254; 343/893

(58) Field of Classification Search
CPC ...... H04W 88/00; H04L 41/12; H01Q 21/061
USPC ......................................................... 455/507
See application file for complete search history.

(56) References Cited

U.S. PATENT DOCUMENTS 4,858,225 A * 8/1989 deSantis ........................ 370/323
(Continued)

FOREIGN PATENT DOCUMENTS

EP 1890510 2/2008
GB 2433176 6/2007
(Continued)

OTHER PUBLICATIONS
International Preliminary Report for PCT/EP10/63926 issued on Apr. 5, 2012.
(Continued)

*Primary Examiner* — Hai V Nguyen
(74) *Attorney, Agent, or Firm* — Stephen H. Eland; Dann, Dorfman, Herrell & Skillman

(57) ABSTRACT

The present disclosure provides an antenna array (1) for relaying radio signals into a cell (10) of a communication network (500). The antenna array (1) comprises a plurality of uplink beam forming vectors (20*u*) selectable as an uplink beam shape for an uplink relaying and a plurality of downlink beam forming vectors (20*d*) selectable as a down link beam shape for a down link relaying. The plurality of uplink beam forming vectors (20*u*) and/or the plurality of the downlink beam forming vectors (20*d*) may be adjusted at a digital radio interface and forwarded from the digital radio interface to the antenna array (1). An individual one (22*u*) of the plurality of uplink beam forming vectors (20*u*) and an individual one (22*d*) of the plurality of downlink beam forming vectors (20*d*) are independently selectable using a local knowledge (60) about the cell 10. The present disclosure further provides a communication network (500) comprising a plurality of the antenna arrays (1-1, 1-2, ..., 1-N) for relaying radio signals into the communication network (500). The communication network (500) further comprises a network playing system (200) adapted to independently select an individual one (22*u*-1, 22*u*-2, ..., 22*u*-N) of the plurality of uplink beam forming vectors (20*u*-1, 20*u*-2, ..., 20*u*-N) and an individual one (22*d*-1, 22*d*-2, ..., 22*d*-N) of the plurality of downlink beam forming vectors (20*d*-1, 20*d*-2, ..., 20*d*-N) for at least one of the antenna arrays (1-1, 1-2, ..., 1-N) using a local knowledge (600) about the communication network (500). The present disclosure further provides a method for relaying radio signals into a cell (10) of the communication network (500), a method (2000) for planning the communication network (500), and a method (5000) for relaying radio signals into cells (10-1, 10-2, ..., 10-N) of the communication network (500); all methods (1000, 2000, 5000) using a knowledge (600) about the communications network (500).

67 Claims, 12 Drawing Sheets

(51) Int. Cl.
*H01Q 1/24* (2006.01)
*H04L 25/03* (2006.01)
*H04W 16/28* (2009.01)

(56) References Cited

U.S. PATENT DOCUMENTS

| | | | | |
|---|---|---|---|---|
| 5,448,621 A * | 9/1995 | Knudsen | ......................... | 455/427 |
| 5,657,323 A * | 8/1997 | Jan et al. | ........................ | 370/252 |
| 5,790,534 A * | 8/1998 | Kokko et al. | .................. | 370/335 |
| 5,886,988 A * | 3/1999 | Yun et al. | ...................... | 370/329 |
| 5,924,015 A * | 7/1999 | Garrison et al. | ............. | 455/13.4 |
| 5,960,354 A * | 9/1999 | Einola | ........................... | 455/454 |
| 5,963,865 A * | 10/1999 | Desgagne et al. | ............. | 455/450 |
| 6,055,431 A * | 4/2000 | Dybdal | ........................ | 455/450 |
| 6,233,466 B1 * | 5/2001 | Wong et al. | ................. | 455/562.1 |
| 6,269,242 B1 * | 7/2001 | Leopold et al. | ............... | 455/427 |
| 6,282,434 B1 | 8/2001 | Johannisson et al. | | |
| 6,438,354 B2 * | 8/2002 | Thompson et al. | ........... | 455/12.1 |
| 6,606,482 B1 * | 8/2003 | Wheeler | ...................... | 455/11.1 |
| 6,697,619 B1 * | 2/2004 | Hogberg et al. | .............. | 455/429 |
| 6,844,844 B1 * | 1/2005 | Aguttes | .......................... | 342/354 |
| 6,862,269 B1 * | 3/2005 | Nasta | ............................ | 370/320 |
| 7,408,507 B1 * | 8/2008 | Paek et al. | ..................... | 342/368 |
| 7,613,232 B2 * | 11/2009 | Meir et al. | .................... | 375/211 |
| 7,653,416 B2 * | 1/2010 | Washiro | ...................... | 455/562.1 |
| 7,668,509 B2 * | 2/2010 | Greeley | ........................ | 455/42 |
| 7,970,345 B2 * | 6/2011 | Cummiskey et al. | ......... | 455/12.1 |
| 8,060,076 B2 * | 11/2011 | Shiver et al. | .................. | 455/423 |
| 8,223,821 B2 * | 7/2012 | Hannan et al. | ................ | 375/211 |
| RE44,173 E | 4/2013 | Noll et al. | ..................... | 455/446 |
| 8,432,805 B2 * | 4/2013 | Agarwal | ........................ | 370/235 |
| 8,432,929 B2 * | 4/2013 | Wilson et al. | .................. | 370/442 |
| 8,433,332 B2 * | 4/2013 | Agarwal | ........................ | 455/450 |
| 8,442,432 B2 * | 5/2013 | Agarwal | ........................ | 455/17 |
| 8,634,296 B2 * | 1/2014 | Agarwal | ........................ | 370/235 |
| 8,660,165 B2 * | 2/2014 | Hannan et al. | ................ | 375/142 |
| 8,705,560 B2 * | 4/2014 | Wilson et al. | .................. | 370/442 |
| 8,712,337 B2 * | 4/2014 | Shiver et al. | .................. | 455/67.11 |
| 2003/0153316 A1 * | 8/2003 | Noll et al. | ..................... | 455/446 |
| 2004/0224637 A1 * | 11/2004 | Silva et al. | ..................... | 455/63.4 |
| 2005/0148840 A1 * | 7/2005 | Lazenby | ........................ | 600/407 |
| 2007/0223423 A1 | 9/2007 | Kim et al. | | |
| 2008/0045143 A1 * | 2/2008 | Yoshida et al. | .................... | 455/7 |
| 2008/0198793 A1 * | 8/2008 | Lysejko et al. | ................. | 370/328 |
| 2008/0219194 A1 | 9/2008 | Kim et al. | | |
| 2008/0240031 A1 * | 10/2008 | Nassiri-Toussi et al. | ..... | 370/329 |
| 2008/0254752 A1 * | 10/2008 | Oh et al. | ......................... | 455/83 |
| 2009/0058725 A1 * | 3/2009 | Barker et al. | ................. | 342/372 |
| 2009/0196362 A1 | 8/2009 | Song et al. | | |
| 2009/0201214 A1 * | 8/2009 | Falk | ........................... | 343/853 |
| 2010/0098105 A1 | 4/2010 | Hung et al. | | |
| 2010/0240313 A1 * | 9/2010 | Kawai | ........................ | 455/67.11 |
| 2010/0261440 A1 | 10/2010 | Corman et al. | | |
| 2011/0105170 A1 | 5/2011 | Gan et al. | | |
| 2011/0223925 A1 | 9/2011 | Gale et al. | | |
| 2012/0184229 A1 | 7/2012 | Corman et al. | | |

FOREIGN PATENT DOCUMENTS

| | | |
|---|---|---|
| WO | 99/17576 | 4/1999 |
| WO | 2004/042959 | 5/2004 |
| WO | 2007/091024 | 8/2007 |

OTHER PUBLICATIONS

International Search Report for PCT/EP10/63926 issued on Mar. 3, 2011.

* cited by examiner

ANTENNA ARRAY, NETWORK PLANNING SYSTEM, COMMUNICATION NETWORK AND METHOD FOR RELAYING RADIO SIGNALS WITH INDEPENDENTLY CONFIGURABLE BEAM PATTERN SHAPES USING A LOCAL KNOWLEDGE

CROSS REFERENCE TO OTHER APPLICATIONS

The present application is related to U.S. patent application Ser. No. 12/563,638entitled: "User Group Specific Beam Forming in a Mobile Network", filed Sep. 21, 2009. The entire disclosure of the foregoing application is incorporated herein by reference.

FIELD OF THE INVENTION

The field of the invention relates to an antenna array with independently configurable beam pattern shapes.

BACKGROUND OF THE INVENTION

With the increasing use of mobile communications systems, operators of mobile communications systems need more transmitters, receivers and/or transceivers relaying into cells of the mobile communications systems, such as for example base stations, in order to meet the increased demand for telecommunications.

It is expensive for the operators to increase the number of the base stations. Maintenance of the base stations may, for example, require an engineer to be present at the site of the base station. The increased number of the base stations therefore requires an increased number of service engineers to maintain the increased number of base stations.

With the increased number of the base stations a level of interference is increased between the cells of the mobile communication network. A signal transmitted from a handset of a user outside an individual cell may be sensed as an interference signal by the antenna array of the individual cell. The interference signal is in particular present if users within the individual cell and users outside the individual cell share the same frequency, as is normally the case with modern communication protocols in mobile communication networks.

The antenna array uses a beam to transmit radio signals in a downlink to the handset of the users within the cell. Likewise, the antenna array uses an uplink beam for receiving radio signals from the handsets of the users within the cell. In the prior art the uplink beam pattern and the downlink beam pattern are identical. The prior art teaches as one option an increase in a downlink tilt angle for the antenna array of the cell in order to reduce the interference caused by the base station to users outside the cell. In the prior art the increase in the downlink tilt angle would also cause an increase in an uplink tilt angle. The increase in the uplink tilt angle causes a reduction in interference from the users outside of the cell in the uplink relaying to the base station for the users within the cell. A reduction in coverage area is a trade off when increasing the downlink tilt angle of the downlink beam shape.

With a roll-out of the telecommunications network a network provider is focusing on different aspects during the progression of the telecommunications network. Coverage of the cell, more precisely a sector of the cell is paramount when first setting up the antenna array of the cell. Later in time, the number of the antenna arrays has concomitantly increased with the number of the cells. Therefore the interference caused by users outside the cell is increased. In the prior art it was common to progressively down tilt the antenna arrays in order to reduce the interference from the users outside the cell. It is quite common that radio signals are scattered along a multitude of paths when relayed into the cell. If for example a scattering of radio signals within the cell was substantially changed, it was necessary for a network provider to replace the antenna arrays originally provided by new antenna arrays that are more suitable for the changed scattering conditions present.

WO 99/17576 to Ericsson Radio Systems AB discloses a method and an apparatus for optimizing an antenna tilt angle. The Ericsson patent provides a method for optimizing an advantage of the increased down tilt angle and the concomitant effect of the reduction in the coverage area. The optimum antenna down tilt angle can be identified as the antenna down tilt angle reflecting a maximum interference reduction with respect to a reduction in coverage area. For the Ericsson patent the downlink tilt angle and the uplink tilt angle are identical.

U.S. Pat. No. 6,682,434 to Ericsson incorporates an uplink and downlink transmission quality improvement by differentiated base station antenna beam down tilt angles. A method and an apparatus are disclosed for providing a substantial gain in downlink coverage over interference by means of differentiated beam down tilt angles while still maintaining the coverage limiting signal strength in the uplink by the use of different antenna beam down tilt angles for the transmit and receive antenna beams.

SUMMARY OF THE INVENTION

The present disclosure provides an antenna array with a plurality of antenna elements for relaying radio signals into a cell of a communication network. The antenna array comprises a plurality of uplink beam forming vectors adapted to form a plurality of uplink beam shapes for an uplink relaying. An individual one of the plurality of uplink beam vectors comprises uplink factors for the antenna elements. The antenna array further comprises a plurality of downlink beam forming vectors adapted to form a plurality of downlink beam shapes for a downlink relaying. An individual one of the plurality of downlink beam forming vectors comprises downlink factors for each one of the antenna elements. The uplink factors of the individual one of the plurality of uplink beam forming vectors and the downlink factors of the individual one of the plurality of downlink beam forming vectors are independently selectable. The individual one of the plurality of uplink beam forming vectors comprises the uplink factors or at least a subset of the antenna elements. Alternatively the uplink factors may be provided to all of the antenna elements. It is to be understood that providing the uplink factors to a subset of the antenna elements allows dividing the antenna array into several sub arrays. As the uplink factors are selectable independently, a subdividing of the antenna array is achievable without any hardware changes. The subdividing corresponds to a grouping of the uplink factors The uplink factors include, but are not limited to, amplitude and phase weighting that is applied to an individual one of the antenna elements for the uplink relaying. The uplink factors may further include a delay added to for the individual one of the antenna elements. More than one uplink factor may be applied to the individual one of the antenna elements. The combinations of the uplink factors may also be considered to be a new uplink factor. For example, the superposition of an amplitude and phase weighting with a delay can be considered as the new uplink factor.

The individual one of the downlink beam forming vectors may comprise the downlink factors for a subset of the antenna elements. Alternatively the individual one of the downlink beam forming vectors may be provided for all of the antenna elements. As mentioned previously, it is possible to form sub arrays within the antenna array, such that only some of the antenna arrays are grouped into one or more of the sub arrays. As the downlink factors are adjustable independently, the dividing of the antenna array, when used for the downlink, into several ones of the sub arrays, may be represented by a grouping of the downlink factors. Therefore, as for the uplink, there is no substantial hardware change required in order to achieve the dividing of the antenna elements of the antenna array into sub arrays.

The downlink factors include, but are not limited to amplitude and phase weighting that is applied to an individual one of the antenna elements for the downlink relaying. The downlink factors may further include a delay being added to for the individual one of the antenna elements. Similarly, as noted above with respect to the uplink factors, it is possible have combinations of more than one downlink factor applied to the individual one of the antenna elements.

A communication network is disclosed. The communication network comprises a plurality of an antenna arrays and a network planning system. Each one of the plurality of the antenna arrays has a plurality of antenna elements. Each one of the antenna arrays comprises a plurality of uplink beam forming vectors adapted to form a plurality of uplink beam shapes. An individual one of the plurality of uplink beam forming vectors comprises uplink factors for the antenna elements describing an individual one of the plurality of uplink beam shapes. Each one of the antenna arrays further comprises a plurality of downlink beam forming vectors adapted to form a plurality of downlink beam shapes of the individual antenna array. An individual one of the antenna arrays of the plurality of downlink beam forming vectors comprises downlink factors for the antenna elements. The downlink factors describe an individual one of the plurality of downlink beam shapes. The network planning system is adapted to independently select the uplink factors of the individual one of the plurality of uplink beam forming vectors and the downlink factors of the individual one of the plurality of downlink beam forming vectors for at least one of the antenna arrays. As mentioned previously the uplink factors may be provided for a subset of the antenna elements only. Likewise the downlink factors may be provided for a further subset of the antenna elements only. It is possible that more than one subset of the antenna elements is selected within the antenna array. The selection of the subsets of the antenna elements within the antenna array is possible independently for the uplink relaying and the downlink relaying. As the uplink factors and/or the downlink factors are selectable independently, the dividing into the subsets of the antenna elements can be conveniently represented by grouping the uplink factors and/or the downlink factors, accordingly.

A network planning system is provided for planning a communication network. The communication network comprises a plurality of antenna arrays. The antenna arrays comprise a plurality of antenna elements. The plurality of antenna arrays is adapted for relaying radio signals into cells of the communication network. Each of the antenna arrays comprises a plurality of uplink beam forming vectors adapted to form a plurality of uplink beam shapes for an uplink relaying within an individual one of the antenna arrays. An individual one of the plurality of uplink beam forming vectors comprises uplink factors for the antenna elements. Each of the antenna arrays further comprises a plurality of downlink beam forming vectors adapted to form a plurality of downlink beam shapes for a downlink relaying within the individual one of the antenna arrays of the communication network. An individual one of the plurality of downlink beam forming vectors comprises downlink factors for the antenna elements. The network planning system is adapted to independently select the uplink factors of the individual one of the plurality of uplink beam forming vectors and the downlink factors of the individual one of the plurality of downlink beam forming vectors for at least one of the plurality of the antenna arrays.

The present disclosure provides a method for generating beam shapes for a relaying of radio signals into a cell of a communication network. The method comprises a step of providing a plurality of uplink beam forming vectors and a step of providing a plurality of downlink beam forming vectors. The providing of a plurality of uplink beam forming vectors yields a plurality of uplink beam forming vectors adapted to form a plurality of uplink beam shapes for an antenna array with a plurality of antenna elements. An individual one of the plurality of uplink beam forming vectors comprises uplink factors for the antenna elements describing an individual one of the plurality of uplink beam shapes. The providing of a plurality of downlink beam forming vectors yields a plurality of downlink beam forming vectors adapted to form a plurality of downlink beam shapes. An individual one of the plurality of downlink beam shapes comprises downlink factors for the antenna elements describing an individual one of the downlink beam shapes.

The present disclosure provides a method for relaying radio signals using generated beam shapes into a cell of a communication network. The generated beam shapes are relayed by an antenna arrays. Each of the antenna arrays comprises a plurality of antenna elements. The method comprises a step of generating beam shapes. The method further comprises a step of relaying radio signals into the cell by the antenna array using the generated beam shapes. The generating of beam shapes comprises a step of providing a plurality of uplink beam forming vectors adapted to form a plurality of uplink beam shapes for an antenna array with a plurality of antenna elements. An individual one of the plurality of uplink beam forming vectors comprises uplink factors for the antenna elements describing an individual one of the plurality of uplink beam shapes. The generating of beam shapes further comprises a step of providing a plurality of downlink beam forming vectors adapted to form a plurality of downlink beam shapes. An individual one of the plurality of downlink beam shapes comprises downlink factors for the antenna elements describing an individual one of the downlink beam shapes.

The disclosure provides a method for planning a communication network comprising a plurality of antenna arrays. Each antenna array comprises a plurality of antenna elements. The plurality of antenna arrays relays radio signals into cells of the communication network. The method comprises a step of generating beam shapes for a relaying of radio signals into an individual one of the cells for at least one of the antenna arrays.

A method for relaying radio signals using generated beam shapes into cells of a communication network is provided. The communication network comprises a plurality of antenna arrays. Each antenna array comprises a plurality of antenna elements. The method comprises a step of generating beam shapes for a relaying of radio signals into an individual one of the cells for at least one of the antenna arrays. The method further comprises a relaying of radio signals into the cells of the communication network. The planning and the relaying may use a local knowledge about the network. The step of generating beam shapes for the relaying of radio signal comprises a step of providing a plurality of uplink beam forming vectors and a step of providing a plurality of downlink beam forming vectors. The plurality of uplink beam forming vectors is adapted to form a plurality of uplink beam shapes for at least an individual one of the plurality of antenna arrays. An individual one of the plurality of uplink beam forming vectors comprises uplink factors for the antenna elements describing an individual one of the plurality of uplink beam shapes. The plurality of downlink beam forming vectors is adapted to form a plurality of downlink beam shapes for at least one of the plurality of the antenna arrays. An individual one of the plurality of downlink beam forming vectors comprises downlink factors for the antenna elements describing an individual one of the plurality of uplink beam shapes.

In another aspect the present disclosure relates to a computer programme product, the computer programme product comprising executable instructions for manufacturing the antenna array for relaying radio signals into a cell of a communication network. The antenna array comprises a plurality of antenna elements. The antenna array comprises a plurality of uplink beam forming vectors and a plurality of downlink beam forming vectors. The plurality of uplink beam forming vectors is adapted to form a plurality of uplink beam shapes. An individual one of the plurality of uplink beam forming vectors comprises uplink factors for each one of the antenna elements describing an individual one of the plurality of uplink beam shapes. The plurality of downlink beam forming vectors is adapted to form a plurality of downlink beam shapes. An individual one of the plurality of downlink beam forming vectors is adapted to form a plurality of downlink beam shapes. An individual one of the plurality of downlink beam forming vectors comprises downlink factors for each one of the antenna elements describing an individual one of the plurality of uplink beam shapes. The uplink factors of the individual one of the plurality of uplink beam forming vectors and the downlink factors of the individual one of the plurality of downlink beam forming vectors are independently selectable.

According to a further aspect the present disclosure relates to a computer programme product, the computer programme product comprising executable instructions for manufacturing the network planning system. The network planning system is adapted for planning a communication network. The communication network comprises a plurality of antenna arrays. The antenna arrays comprise a plurality of antenna elements. The plurality of antenna arrays is adapted for relaying radio signals into cells of the communication network. Each of the antenna arrays comprises a plurality of uplink beam forming vectors and a plurality of downlink beam forming vectors. The plurality of uplink beam forming vectors is adapted to form a plurality of uplink beam shapes for an individual one of the antenna arrays. An individual one of the plurality of uplink beam forming vectors comprises uplink factors for the antenna elements describing an individual one of the plurality of uplink beam shapes. The plurality of downlink beam forming vectors is adapted to form a plurality of downlink beam shapes for the individual one of the antenna arrays. An individual one of the plurality of downlink beam forming vectors comprises downlink factors for the antenna elements describing an individual one of the plurality downlink beam shapes. The network planning system is adapted to independently select the uplink factors of the individual one of the plurality of uplink beam forming vectors and the downlink factors of the individual one of the plurality of downlink beam forming vectors for at least one of the plurality of antenna arrays.

In another aspect the disclosure provides a computer programme product, the computer programme product comprising executable instructions for the execution of the method of generating beam shapes for relaying radio signals into a cell of the network. The method of generating beam shapes comprises a providing of a plurality of uplink beam forming vectors and a providing of a plurality of uplink beam forming vectors and a providing of a plurality of downlink beam forming vectors. The uplink beam forming vectors are adapted to form a plurality of uplink beam shapes for an antenna array with a plurality of antenna elements. An individual one of the plurality of uplink beam forming vectors comprises uplink factors for the antenna elements describing an individual one of the plurality of uplink beam shapes. The plurality of downlink beam forming vectors is adapted to form a plurality of downlink beam shapes. An individual one of the plurality of downlink beam forming vectors comprises downlink factors for the antenna elements describing an individual one of the plurality of downlink beam shapes.

In another aspect the disclosure provides a computer programme product, the computer programme product comprising executable instructions for the execution of the method of relaying radio signals using generated beam shapes into a cell of the network.

The generating of beam shapes comprises a step of providing a plurality of uplink beam forming vectors adapted to form a plurality of uplink beam shapes for an antenna array with a plurality of antenna elements. An individual one of the plurality of uplink beam forming vectors comprises uplink factors for the antenna elements describing an individual one of the plurality of uplink beam shapes. The generating of beam shapes further comprises a step of providing a plurality of downlink beam forming vectors adapted to form a plurality of downlink beam shapes. An individual one of the plurality of downlink beam shapes comprises downlink factors for the antenna elements describing an individual one of the downlink beam shapes.

Yet another aspect of the disclosure relates to a computer programme product, the computer programme product comprising executable instructions for the execution of the method of planning the network. The network comprises a plurality of antenna arrays for relaying radio signals into cells of the communication network. The antenna arrays comprise a plurality of antenna elements. The method comprising a step of generating beam shapes for relaying of radio signals into an individual one of the cells for at least one of the antenna arrays with the plurality of the antenna elements.

Another aspect of the disclosure relates to a computer programme product, the computer programme product comprising executable instructions for the execution of the method of relaying radio signals into cells of the network using generated beam shapes. The method comprises a step of generating beam shapes for a relaying of radio signals into an individual one of the cells for at least one of the antenna arrays with a plurality of antenna elements. The method further comprises a step of relaying radio signals into the individual one of the cells by at least one of the antenna arrays with a plurality of antenna elements.

The term relaying as described herein shall be construed as comprising a transmitting by the antenna element and/or a receiving by the antenna element.

The term communication network as used herein shall be construed as a mobile communication network covering an area by a plurality of cells. The communication network may also be referred to as network in short.

DETAILED DESCRIPTION OF THE INVENTION

For a better understanding of the present disclosure reference shall now be made to preferred aspects of the present disclosure, examples of which are illustrated in the accompanying drawings.

Figure 1A:
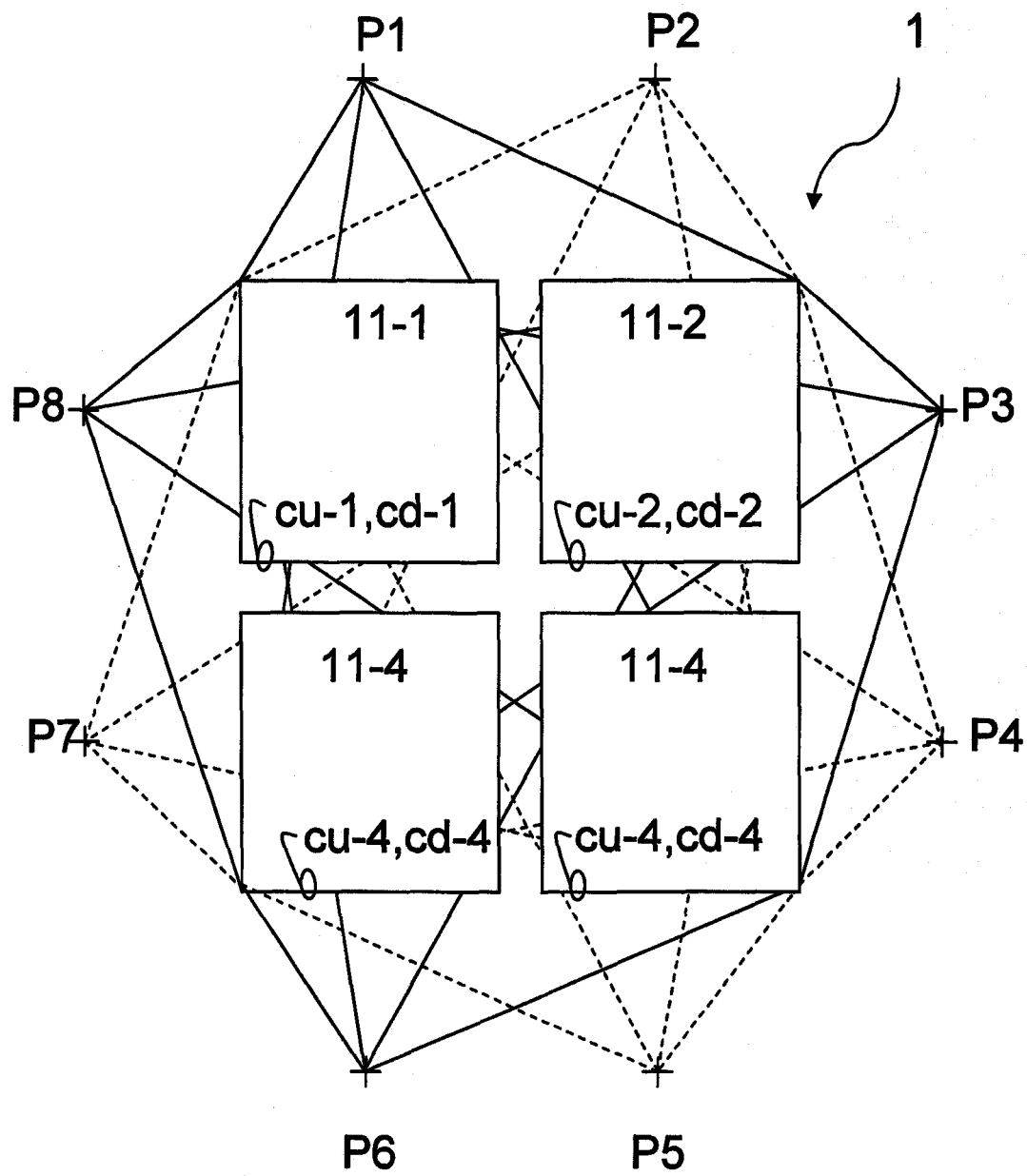
FIG. 1a shows an example of an antenna array.

FIG. 1a shows an antenna array 1 of the present disclosure. The antenna array 1 comprises four antenna elements 11-1, 11-2, 11-3, 11-4. Without any limitation the antenna array 1 may comprise more than four of the antenna elements 11-1, 11-2, ..., 11-j. Antenna arrays known in the prior art allow a beam steering. The beam steering is provided by providing a defined phase and amplitude relation between the antenna elements 11-1, 11-2, ..., 11-j. In the prior art the phase and amplitude relation is fixed between individual ones of the antenna elements 11-1, 11-2, ..., 11-j. Typically passive combiner networks are used in order to combine a received signal. Likewise fixed amplitudes and phases are used in order to provide the defined phase and amplitude differences between the individual ones of the antenna elements 11-1, 11-2, ..., 11-j when transmitting radio signals. The phase and amplitude for each one of the antenna elements 11-1, 11-2, ..., 11-j may be expressed in terms of complex factors. The complex factors describe a phase and amplitude as is known in the art. The antenna array 1 according to the present disclosure provides uplink factors cu-1, cu-2, ..., cu-j describing the complex factors used for the uplink relaying by the antenna array 1. The uplink factors cu-1, cu-2, ..., cu-j may further comprise an individual delay for each one of the antenna elements 11-1, 11-2, ..., 11-j. Furthermore the antenna array 1 of the present disclosure provides downlink factors cd-1, cd-2, ..., cd-j being used for a downlink relaying of the antenna array 1. As mentioned previously, the downlink factors cd-1, cd-2, ..., cd-j may further comprise an individual delay for each one of the antenna elements 11-1, 11-2, ..., 11-j. The antenna elements 11-1, 11-2, ..., 11-j are typically arranged in a plane. In FIG. 1a the individual ones of the antenna elements 11-1, 11-2, ..., 11-j are indicated as rectangles. Without any limitation any other shape of the antenna elements 11-1, 11-2, ..., 11-j is conceivable. Furthermore in FIG. 1a the antenna elements 11-1, 11-2, ..., 11-j are arranged in a 2×2 arrangement. Without any limitation any other arrangement is conceivable, for example a 1×4 arrangement. Different to the prior art the present disclosure provides the uplink factors cu-1, cu-2, ..., cu-j and the downlink factor cd-1, cd-2, ..., cd-j independently to each one of the antenna elements 11-1, 11-2, ..., 11-j. Therefore a considerable amount of beam steering is possible with the antenna array 1 of the present disclosure. FIG. 1a depicts eight examples of locations P1, P2, ..., P8 where a maximum energy relayed by the antenna array 1 may be located. In FIG. 1a the antenna array 1 is relaying into the half space underneath the figure. With the appropriate uplink factors cu-1, cu-2, ..., cu-j and the appropriate downlink factors cd-1, cd-2, ..., cd-j the maximum energy received and/or transmitted may be steered to either of the positions P1, P2, ..., P8. Using a different set of the uplink factors cu-1, cu-2, ..., cu-j, the maximum energy for the uplink relaying will be picked up from the position P2. Likewise using appropriate downlink factors cd-1, cd-2, ..., cd-j the maximum downlink energy will be transmitted to the location P2. P1 and P2 denote two different locations in the azimuth. Positions P6 and P5 denote the same position in the azimuth as P1 and P2, but at different elevations. Likewise, positions P8 and P3 denote identical elevations of the beam at different azimuth angles. The azimuth angle of P8 is larger than the azimuth of P1 and P2. The azimuth for P3 and P4 is instead identical but negative to azimuth of P8 and P7.

It will be readily appreciated by a person skilled in the art that the antenna array 1 using the uplink factor cu-1, cu-2, ..., cu-j and the downlink factors cd-1, cd-2, ..., cd-j provides a greater liberty in steering and shaping the beam than with the prior art. Furthermore it is to be understood that the uplink factors cu-1, cu-2, ..., cu-j and the downlink factors cd-1, cd-2, ..., cd-j can be chosen independently. In other words the beam can be steered to a different position, for example to P1 for the uplink relaying, and to a different position, for example P3, for the downlink relaying. It is to be understood that the eight positions P1, P2, ..., P8 are only illustrated as examples but do not limit the flexibility of the present disclosure. It is further to be understood that for an uplink relaying the uplink factors cu-1, cu-2, ..., cu-j may be alternated upon reception. Each one of the antenna elements 11-1, 11-2, ..., 11-j will receive an individual receive signal. For the uplink relaying the individual received signals are multiplied by the uplink factors cu-1, cu-2, ..., cu-j.

By applying one set of the uplink factors cu-1, cu-2, ..., cu-j a composite uplink signal can be formed. Using a second set of uplink factors cu-1, cu-2, ..., cu-j to be applied to the same receive signals of the antenna elements 11-1, 11-2, ..., 11-j will yield a second combined receive signal. The first combined uplink signal may for example correspond mainly to radio signals received from the position P1, whereas the second combined uplink signal may instead mostly correspond to signals received from the position P5 depending on the first set of uplink factors cu-1, cu-2, ..., cu-j and the second set of uplink factors cu-1, cu-2, ..., cu-j. Without any limitation the uplink factors may be amended to reach any of the positions possible. It is to be understood that the flexibility in steering and shaping the uplink and downlink patterns depends on the physical transmission characteristics of the antenna elements 11-1, 11-2, ..., 11-j. The relaying characteristics of the antenna elements 11-1, 11-2, ..., 11-j may without any limitation comprise a dipole characteristic.

Figure 1B:
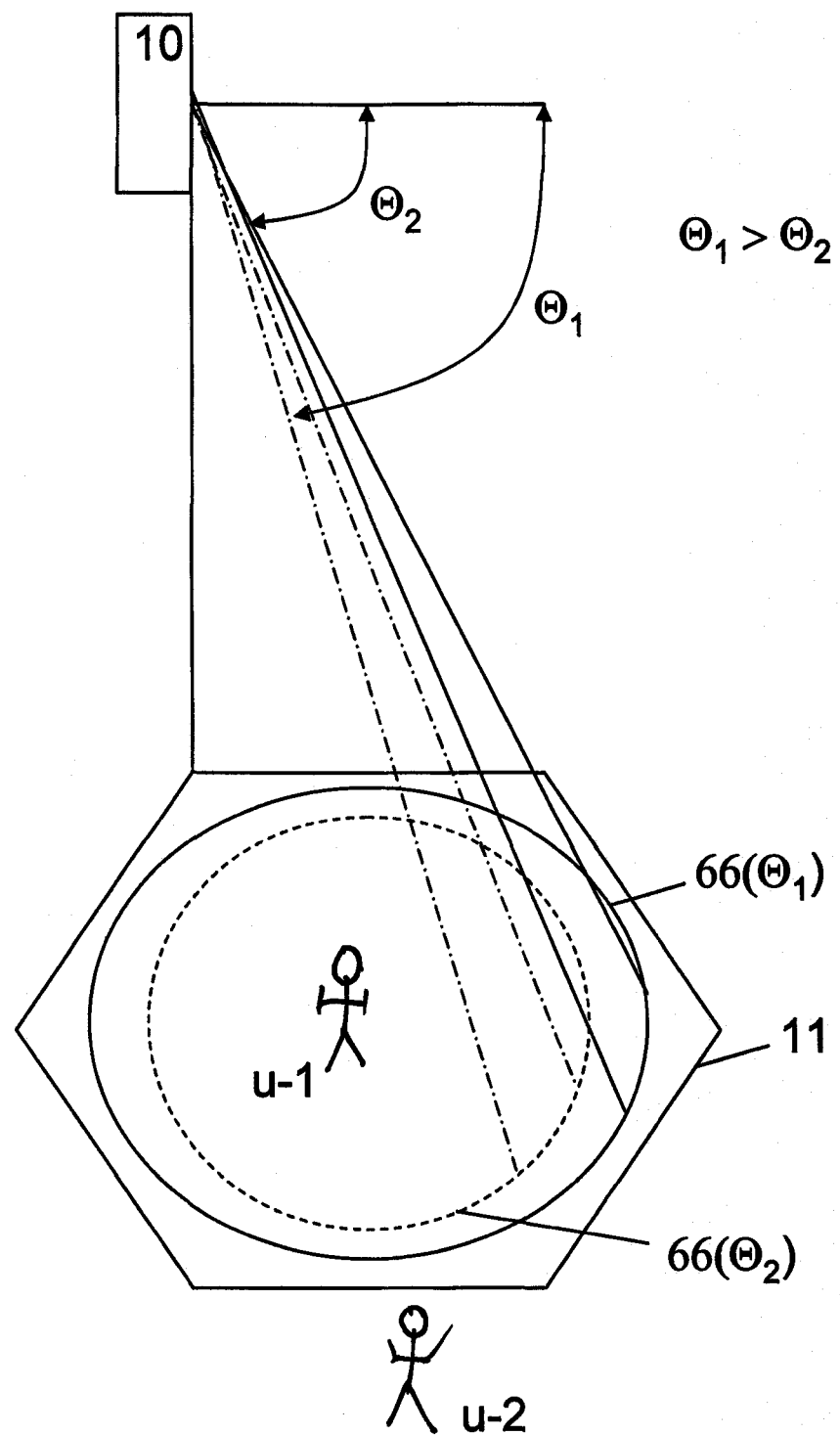
FIG. 1b shows an antenna array relaying into a cell of a communication network using different tilt angles.
Figure 1C:
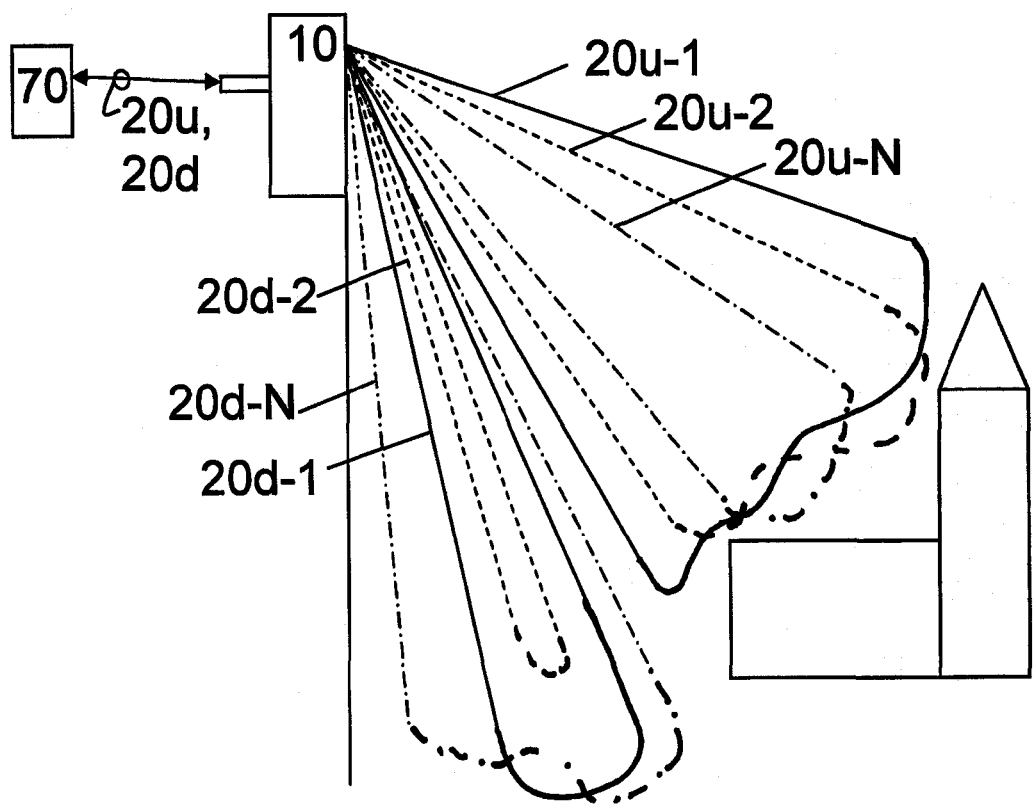
FIG. 1c shows an antenna array providing different beam shapes for an uplink and a downlink.

FIG. 1b shows a cell 10 of a communication network 500 (see FIG. 1c). The cell 10 comprises an antenna array 1 relaying radio signals into the cell 10, typically only into a sector of the cell 10. The antenna array 1 comprises a plurality of antenna elements 11-1, 11-2, ..., 11-j (see FIG. 1a). The antenna array 1 typically relays the radio signals into the cell 10 with a beam pattern 24 as depicted in FIG. 1a. The beam pattern 24 or beam shape can be formed by the antenna array 1 and also directed by the antenna array 1, as is known in the art. The present disclosure increases the amount of beam steaming and shaping, as discussed with FIG. 1a. The beam forming can be described using beam forming vectors. An uplink beam forming vector 20-u comprises the uplink factors cu-1, cu-2, . . . , cu-j as depicted within FIG. 1a. The downlink beam forming vector 20-d comprises the downlink factors cd-1, cd-2, . . . , cd-j as explained with respect to FIG. 1a. It is to be understood that the antenna array 1 allows an independent steering of the uplink beam and the downlink beam. In the prior art a steering of the beam pattern 24 was provided using passive networks adapted to impose phase and amplitude differences between the individual ones of the antenna elements 11-1, 11-2, . . . , 11-j. It is to be understood that the passive networks would restrict the beam forming vectors to an individual one that is constantly used for the uplink relaying. Likewise a passive network would restrict the downlink beam forming vector to an individual one in the prior art.

Beam tilting is a known technique used to reduce interference from neighbouring cells 10 in a mobile communication network 500. It may be sufficient to provide a mechanical beam tilting, if one is only interested in a down tilting of the beam pattern 24 relayed by the antenna element 1. The mechanical beam tilting is adapted to vary a down tilt angle Θ (short tilt angle Θ). The tilt angle Θ is measured from a horizontal line downwards away from the horizontal in a positive way. For the mechanical tilt it may be sufficient to tilt the antenna array 1 as such downwards under the horizon. In FIG. 1b there are two different beam shapes 24 depicted. The beam shape 24 of the antenna array 1 is less sensitive to any radio signals pertaining from a handset of a user u2 outside the cell 10 when increasing the tilt angle Θ. Any signals from the user u2 outside the cell will be received by the antenna array 1 as interference. An increase in user u2 outside the cell 10 will increase the radio signals from outside the cell 10 being received as interference by the antenna array 1 of the cell 10. In particular if adjacent cells 10 share the same frequency, as is typically the case.

The increase in the interference from outside the cell 10 will be added to the radio signals pertaining to the users within the cell 10, such as a user u1 within the cell 10. It is of interest to increase the tilt angle Θ in order to reduce the interference from outside the cell 10. Consequently, a signal to interference and noise ratio SINR will be increased by increasing the tilt angle Θ. The antenna array 1 will be more sensitive to the radio signals from inside the cell 10 with the increased tilt angle Θ.

A drawback of increasing the down tilt angle Θ is a reduced coverage area 66 within the cell 10. In FIG. 1b the coverage area 66 ($\Theta_1$) for a first tilt angle $\Theta_1$ is indicated as a dotted line. A coverage area 66 ($\Theta_2$) for a second tilt angle $\Theta_2$ greater the first tilt angle $\Theta_1$ is depicted in FIG. 1b using a solid line. It will be readily appreciated that with increased tilt angle Θ the coverage area 66 (Θ) is reduced. It will be further appreciated that a coverage area 66u ($\Theta_1$) may be defined for an uplink relaying by the antenna array 1 as well as a coverage area 66d ($\Theta_2$) for a downlink relaying of the antenna array 1, provided the tilt angle $\Theta_1$ and $\Theta_2$ can be set independently for the uplink relaying and the downlink relaying.

For antenna arrays within the prior art it was common to use identical tilt angels for the downlink relaying as well as for the uplink relaying. It maybe of interest for an operator to use a smaller tilt angle for the uplink relaying than for the downlink relaying. This means the tilt angle Θ for radio signals received by the antenna array 1 may be larger than for the transmitting into the cell 10 by the antenna array 1. Keeping the coverage area 66u for an uplink larger than the coverage area 66d for a downlink will be of advantage in order to help a smooth handover from a first cell 10 of the communication network 500 to an adjacent cell 10 of the communication network 500. It is therefore of interest to provide an antenna array 1 wherein the tilt angles Θ can be independently adjusted for the downlink relaying and the uplink relaying.

FIG. 1c shows cross sections of a plurality of uplink beam shapes. The cross sections shown in FIG. 1c are cross sections within a vertical plane. The plane of the paper corresponds to the vertical plane. It will be appreciated that there is a plurality of vertical planes, all of which are perpendicular to a level ground. The horizon will appear as a horizontal line in the plurality of vertical planes. It is to be noted that each beam shape may be attributed a beam forming vector as as explained with FIG. 1a. The beam forming vectors describe a beam shape relayed by the antenna array 1. It is to be understood that the complex factors have to take into account physical properties of the antenna array 1 such as considering delay times and gain and/or attenuating properties of the antenna system 1. The uplink beam forming vectors 20u-1, 20u-2, . . . , 20u-N and/or the downlink beam forming vectors 20d-1, 20d-2, . . . , 20d-N need therefore to be chosen in combination with the physical properties of the antenna array 1, as mentioned above. The plurality of uplink beam shapes corresponds to a plurality of uplink beam forming vectors 20u-1, 20u-2, . . . , 20u-N. FIG. 1c shows the plurality of uplink beam forming vectors 20u-1, 20u-2, . . . , 20u-N corresponding to three individual uplink beam shapes. Without any limitation any other number of beam forming vectors within the plurality of uplink beam forming vectors 20u-1, 20u-2, . . . , 20u-N is conceivable. Each one of the plurality of uplink beam forming vectors 20u-1, 20u-2, . . . , 20u-N represents a beam shape usable for the uplink relaying of the antenna array 1. Individual ones of the plurality of uplink beam forming vectors 20u-1, 20u-2, . . . , 20u-N may vary the coverage areas 66u (FIG. 1b) for the uplink relaying.

FIG. 1c further shows cross sections of a plurality of downlink beam shapes. It is to be noted that each beam shape may be attributed a beam forming vector as described above. Hence the plurality of downlink beam shapes corresponds to a plurality of downlink beam forming vectors 20d-1, 20d-2, . . . , 20d-N. The cross sections of the plurality of downlink beam forming vectors 20d-1, 20d-2, . . . , 20d-N are shown in the vertical plane within FIG. 1c. FIG. 1c shows the plurality of downlink beam forming vectors 20d-1, 20d-2, . . . , 20d-N comprising three individual beam forming vectors. Without any limitation any other number of beam forming vectors within the plurality of downlink beam forming vectors 20d-1, 20d-2, . . . , 20d-N is conceivable. Each one of the plurality of downlink beam forming vectors 20d-1, 20d-2, . . . , 20u-N represents a downlink beam shape for the downlink relaying of the antenna array 1. Individual ones of the plurality of downlink beam forming vectors 20d-1, 20d-2, . . . , 20d-N may vary the coverage areas 66d for the downlink relaying as discussed with respect to FIG. 1b.

It will be readily appreciated by a person skilled in the art that the present disclosure provides a convenient way of applying a change in tilt angle to the antenna array 1 for the uplink relaying. With all of the uplink factors cu-1, cu-2, . . . , cu-j, corresponding to a an individual uplink beam forming vector 22u, being adjustable independently, it is possible to amend the individual uplink beam forming vector 22u such that the uplink beam shape is of a different tilt angle. One could think of the change in tilt angle as of applying a rotation in the angular plane of the elevation to the uplink factors cu-1, cu-2, . . . , cu-j representing the individual uplink beam shape. An alternative way of thinking of a change in tilt angle is to apply variable delays to individual ones of the antenna elements 11-1, 11-2, . . . , 11-j, for example, from top to bottom. It will be readily appreciated that the uplink factors cu-1, cu-2, . . . , cu-j and/or the downlink factors cd-1, cd-2, . . . , cd-j allow greater liberty in terms of beam shaping than only changing the tilt. The antenna array disclosure does not require several passive networks in case one wishes to apply different tilt angles to the antenna array 1. Therefore the antenna array of the present disclosure helps to save cost incurred in manufacturing the antenna array 1 as well as offers greater freedom in steering the beam.

Likewise the present disclosure discloses a way of applying a change in tilt angle to the antenna array 1 for the downlink relaying. With all of the downlink factors cd-1, cd-2, . . . , cd-j, corresponding to a an individual downlink beam forming vector 22d, being adjustable independently, it is possible to amend the individual downlink beam forming vector 22d such that the downlink beam shape is of a different tilt angle. One could think of the change in tilt angle as of applying a rotation in the angular plane of the elevation to the downlink factors cu-1, cu-2, . . . , cu-j representing the individual downlink beam shape.

FIG. 1c shows the antenna array 1 comprising a link 55. The link 55 is adapted to accept the plurality of uplink beam forming vectors 20u-1, 20u-2, . . . , 20u-N as well as the plurality of downlink beam forming vectors 20d-1, 20d-2, . . . , 20d-N.

It may be of advantage to provide the plurality of downlink beam forming vectors 20d-1, 20d-2, . . . , 20d-N such that the coverage area 66d for the plurality of downlink beam forming vectors 20d-1, 20d-2, . . . , 20d-N is smaller than the coverage area 66u for the plurality of uplink beam forming vectors 20u-1, 20u-2, . . . , 20u-N. It is to be understood that the plurality of uplink beam forming vectors 20u-1, 20u-2, . . . , 20u-N and/or the plurality of downlink beam forming vectors 20d-1, 20d-2, . . . , 20d-N may be chosen according to a surrounding of the antenna array 1; represented by a local knowledge 60 about the cell 10.

Placing the antenna array 1 in a rural area in which communication networks 500 tend to be coverage limited may require maximizing an antenna gain in combination with a "slim" beam shape. If the antenna array 1 is mounted in urban canyons, a broad beam may be required such as the plurality of uplink beam forming vectors 20u-1, 20u-2, . . . , 20u-N depicted in FIG. 1c; as in the urban canyons a plurality of scattering objects may be present yielding a propagation of the radio signals in a multitude of directions.

FIG. 1c illustrates a plurality of downlink beam forming vectors 20d-1, 20d-2, . . . , 20d-N being more pointed towards the ground than the plurality of uplink beam forming vectors 20u-1, 20u-2, . . . , 20u-N in order to reduce an interference introduced into neighbouring cells 10 of the communication network 500 (FIG. 1d) by the downlink relaying within the cell 10. In contrast the plurality of uplink beam forming vectors 20u-1, 20u-2, . . . , 20u-N in FIG. 1c are of a shape to allow collecting a larger portion of radio signal power from users at the edge of the cell 10. It is to be understood, that the antenna array 1 allows for the plurality of uplink beam forming vectors 20u-1, 20u-2, . . . , 20u-N and the plurality of downlink beam forming vectors 20u-1, 20u-2, . . . , 20u-N to be selected independently, as explained before.

An individual one 22u-1, 22u-2, . . . , 22u-N of the uplink beam forming vectors 22u-1, 22u-2, . . . , 22u-N is applied to the antenna array 1 by applying the uplink factors cu-1, cu-2, . . . , cu-j to the antenna elements 11-1, 11-2, . . . , 11-j.

Likewise an individual one 22d-1, 22d-2, . . . , 22d-N of the uplink beam forming vectors 20d-1, 20d-2, . . . , 20d-N is applied to the antenna array 1 by applying the downlink factors cd-1, cd-2, . . . , cd-j to the antenna element 11-1, 11-2, . . . , 11-j, as explained with respect to FIG. 1a. The plurality of uplink beam forming vectors 20u-1, 20-2, . . . 20u-N and the plurality of downlink beam forming vectors 20d-1, 20d-2, . . . , 20d-N are provided to the antenna array 1 by a link 55. The link 55 allows for the plurality of uplink beam forming vectors and the plurality of downlink beam forming vectors 20u-1, 20u-2, . . . , 20u-N and 20d-1, 20d-2, . . . , 20d-N to be provided directly at the antenna array 1 using a local network planning module 70. The local network planning module 70 may be part of the antenna array 1. Alternately and without any limitation the plurality of uplink beam forming vectors 20u-1, 20u-2, . . . , 20u-N and the plurality of downlink beam forming vectors 20d-1, 20d-2, . . . , 20d-N may be provided to the antenna array 1 using some sort of a telemetry channel, such as for example a fibre link ending at the link 55 of the antenna array 1. It is further possible to provide the uplink factors cu-1, cu-2, . . . , cu-j to a digital radio interface (DRI) of the antenna array 1. Likewise the downlink factors cd-1, cd-2, . . . , cd-j may be provided to the DRI of the antenna array 1. The concept of the telemetry channel is well known in the art and should not be discussed any further. Without any limitation the plurality of uplink beam forming vectors 20u-1, 20u-2, . . . , 20u-N and the plurality of downlink beam forming vectors 20d-1, 20d-2, . . . , 20d-N may be provided from a network planning system 200 as shall be discussed with respect to FIG. 1d. The plurality of uplink beam forming vectors 20u-1, 20u-2, . . . 20u-n and the plurality of downlink beam forming vectors 20d-1, 20d-2, . . . , 20d-N may be of different beam shapes, as depicted in FIG. 1b. The use of different beam shapes may, for example, help with cross polarized antenna elements to improve a de-correlation of cross polarized channels. The improved de-correlation of the cross polarized channels will help to improve a quality of transmission and/or a quality of reception, if a multiple input multiple output MIMO or diversity transmission and/or reception is applied on the cross polarized channels.

Let us assume the roll-out scenarios, as described above and a dual slant cross polarization antenna array 1. It may be of interest to form the beam with equal power on both of the polarizations when starting the roll-out of the network. Thereby a maximum antenna gain and a maximum output power would be reached for the antenna array 1. In a later phase of the roll-out a two-way MIMO could be introduced by using the first polarization and the second polarization of the antenna array 1. Furthermore the present disclosure discloses applying different beam forming vectors for each one of the first polarization and the second polarization of the two-way MIMO signals. Consequently the MIMO performance is improved. The antenna array may be logically subdivided into the subset of the antenna array 1, for example, into four subsets in even a later phase of the roll-out. An individual one of the sub-arrays is formed, for example, by the upper half of the antenna elements 11-1, 11-2, . . . , 11-j of the first polarization, a second sub-array may in turn be formed by remaining ones of the antenna elements 11-1, 11-2, . . . , 11-j of the first polarization. Likewise a further sub-array may be formed by the upper half of the antenna elements 11-1, 11-2, . . . , 11-j of the second polarization and a fourth sub array may be formed by the lower half of the antenna elements 11-1, 11-2, . . . , 11-j of the second polarization. Each one of the four sub-arrays, in the example given, relays a transmit MIMO signal and/or a receive MIMO signal.

The antenna array 1 is now capable to support four-way MIMO, in the example given above. Beam shaping can be adjusted independently for each one of the sub-arrays, i.e. the uplink factors and/or the downlink factors can be selected independently. It will be appreciated that if the 4-way MIMO de-correlation is improved between the different ones of the sub arrays of the antenna elements 11-1, 11-2, . . . , 11-j the versatility of the antenna-array will be improved.

Figure 1D:
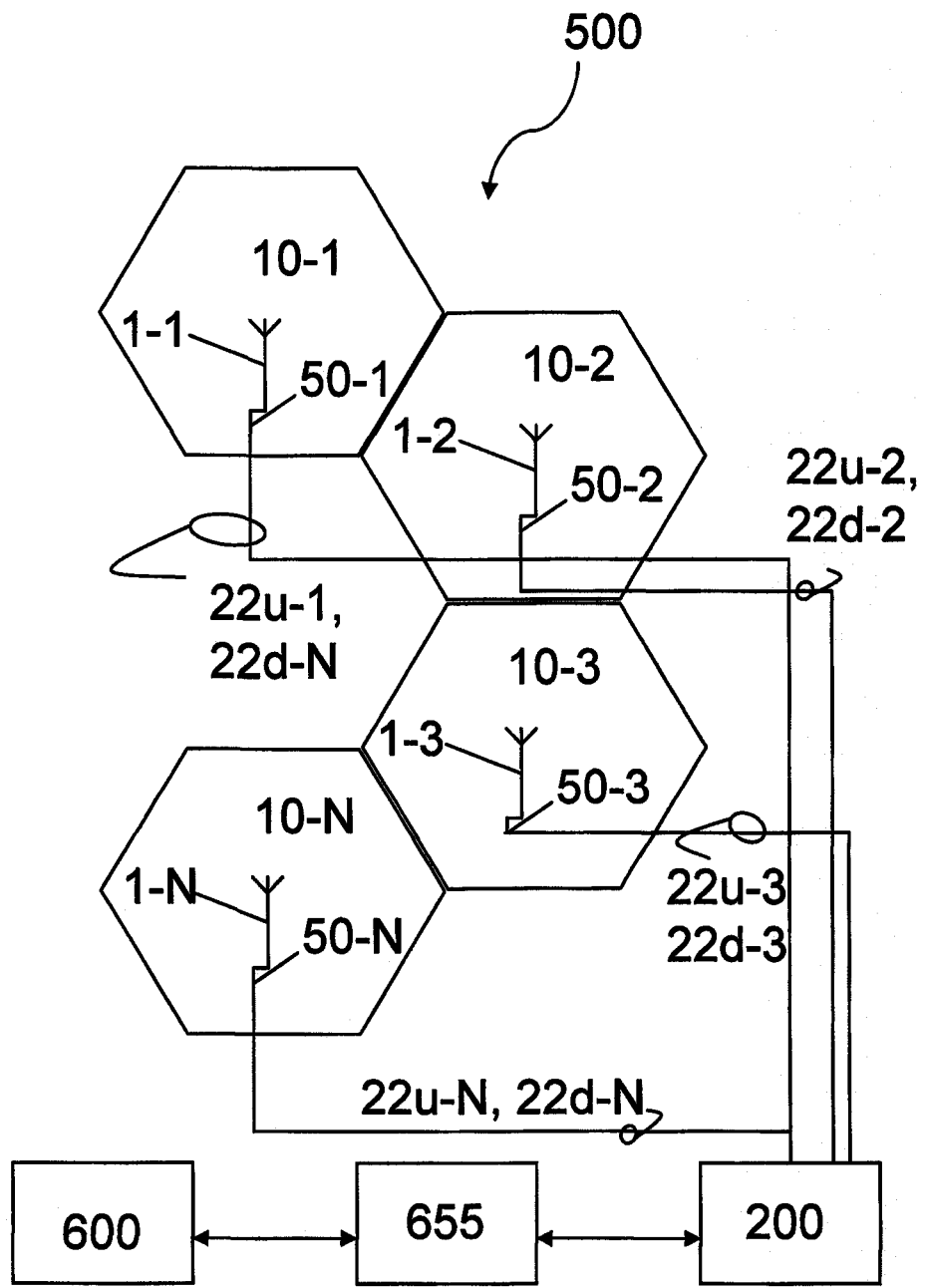
FIG. 1d shows a plurality of antenna arrays relaying into a plurality of cells of the network comprising a network planning system.

The selection of the individual one 22u of the plurality of uplink beam forming vectors 20u-1, 20u-2, . . . , 20u-N and the individual one 22d of the plurality of downlink beam forming vectors 20d-1, 20d-2, . . . , 20d-N may be carried out by the local network planning module 70. Additionally or alternatively the individual one 22u, 22d of the plurality of uplink beam forming vectors 22u-1, 22u-2, . . . , 22u-n and the plurality of downlink beam forming vectors 20d-1, 20d-2, . . . , 20d-N may by carried out by a network planning system 200 as shown in FIG. 1d. It will be appreciated by a person skilled in the art that different network optimisation criteria may be applied for the uplink relaying and/or the downlink relaying, given the uplink factors cu-1, cu-2, . . . , cu-j and/or the downlink factors cd-1, cd-2, . . . , cd-j are independently selectable. The uplink relaying can be optimised for coverage, while the downlink relaying is being optimised for capacity by selecting the appropriate beam forming vectors in the uplink relaying and the downlink relaying independently, as mentioned earlier. Therefore, a degree of independence when optimizing the network planning is considerably increased.

The j antenna elements 11-1, 11-2, . . . , 11-j may form one logical array including all the antenna elements 11-1, 11-2, . . . , 11-j. Any subset of i antenna elements 11-1, 11.-2, . . . , 11-j may form a sub array for i≤j. Each array or sub array may have at least one or multiple, for example N>1, beam forming vectors for the uplink 20u-1, 20u-2, . . . , 20u-N. Each array or sub array may also have N beam forming vectors for the downlink 20d-1, 20d-2, . . . , 20d-N. The beam forming vectors for the uplink 20u-1, 20u-2, . . . , 20u-N and the beam forming vectors for the downlink 20d-1, 20d-2, . . . , 20d-N are provided to the antenna array 1 via the link 55 from, for example, the local network planning module 70 (see FIG. 1c). Some of the signals received by the antenna elements 11-1, 11-2, . . . , 11-j may be combined, for example, using techniques like a maximum ratio combining, in order to benefit from diversity, for those cases in which only M signals with M<N are provided to the antenna array 1. Therefore the antenna array 1 is adapted to map j or i of the antenna elements 11-1, 11-2, . . . , 11-j to N or M received signals.

It is to be understood that the present disclosure provides several variants of signal processing. The N or M signals provided to the antenna array 1 may comprise separated sources for different signals, such as different signals on different carriers. The separation of the different signals will be further improved by the beam forming of the disclosure, as described previously.

Furthermore, for the uplink it is possible to forward identical signals to the antenna array 1. In such a situation the beam forming will provide a separation of the users within the cell 10. The separation of the users is for example, achieved by vertical sectorisation.

The antenna array 1 is adapted to select the individual one 22u of the plurality of uplink beam forming vectors 20u-1, 20u-2, . . . , 20u-N and the individual one 22d of the downlink beam forming vectors 20d-1, 20d-2, . . . , 20d-N. A local knowledge 60 about the cell 10 may be used for selecting the uplink factors cu-1, cu-2, . . . , cu-j for the individual one 22-u of the uplink beam forming vectors 20-u. Likewise the local knowledge 60 may be used for selecting the downlink factors cd-1, cd-2, . . . , cd-j for the individual one 22-d of the downlink beam forming vectors 20-d. It should be possible to derive a most suitable plurality of uplink beam forming vectors 20u-1, 20u-2, . . . , 20u-N and/or a most suitable plurality of downlink beam forming vectors 20d-1, 20d-2, . . . , 20d-N for relaying radio signals into the cell 10 from a topology 62 of the cell 10. The topology 62 may be used to decide whether the cell 10 is located in an urban surrounding or a rather rural surrounding from the local knowledge 60. The uplink factors cu-1, cu-2, . . . , cu-j and/or the downlink factors cd-1, cd-2, . . . , cd-j may be based on a location of the antenna array 1. It is to be understood, that the complex factors may be stored in the antenna array 1 and applied to the antenna array 1. It will be appreciated by a person skilled in the art that the uplink factors cu-1, cu-2, . . . , cu-j and/or the downlink factors cd-1, cd-2, . . . , cd-j provide a substantial freedom in directing and shaping the uplink beam and/or the downlink beam. The increased freedom will help to adapt the antenna array 1 to any changes in the surroundings of the antenna array 1, namely any changes in scattering properties of the surroundings. Typically, radio signals relayed between the antenna array 1 and a user U1 are scattered several times and reach the handset and/or the antenna array 1 after having travelled a plurality of paths. If the plurality of paths available are substantially changed, for example by a multi-storey building, being built in close vicinity of or within the cell 10, this will considerably affect any scattering within the cell 10. Within the prior art the operator of the mobile communication network had no means to react to this kind of changes other than sending a service engineer to the antenna array 1 replacing the old antenna array with a new antenna array having different transfer characteristics. The present disclosure allows to amend the uplink factors cu-1, cu-2, . . . , cu-j and/or the downlink factors cd-1, cd-2, . . . , cd-j in order to find most suitable uplink beam forming vectors 20u-1, 20u-2, . . . , 20u-N and/or a most suitable downlink beam forming vector 20d-1, 20d-2, . . . , 20d-N.

It is possible to apply more than one uplink beam forming vectors 20u-1, 20u-2, . . . , 20u-N to radio signals received by the antenna elements 11-1, 11-2, . . . 11-j, in order to apply a weighting to the received radio signals. In other words it is possible to make the antenna array 1 "look" into more than one direction when receiving radio signals in the uplink relaying from within the cell 10. It is to be understood that the applying of more than one of the uplink beam forming vectors 20u-1, 20u-2, . . . , 20u-N may be done as a post processing of radio signals received by the antenna elements 11-1, 11-2, . . . 11-j. The applying of more than one uplink beam forming vector 20u-1, 20u-2, . . . , 20u-N to one set of radio signals received in the uplink relaying at the antenna elements 11-1, 11-2, . . . , 11-j, an additional amount of data processing and/or storage may be required.

With all of the uplink factors cu-1, cu-2, . . . , cu-j and/or the downlink factors cd-1, cd-2, . . . , cd-j being independently adjustable, it is also conceivable, to construct a beam pattern that comprises more than one region of maximal energy for the downlink relaying and/or the uplink relaying. One is no longer restricted to steer a single beam shape with only one "spot" comprising maximum energy with all the downlink factors cd-1, cd-2, . . . , cd-j being independently selectable. The downlink factors cd-1, cd-2, . . . , cd-j allow providing more than one of the "spots" within the beam relayed by the antenna array 1. As mentioned previously, the several ones of the "spots" may be achieved by directly adjusting all of the downlink factors cd-1, cd-2, . . . , cd-j. As an alternative one may logically divide the antenna array 1 into several ones of the subsets of the antenna elements 11-1, 11-2, ... 11-j, as explained earlier. It will be appreciated that the subsets of the antenna elements 11-1, 11-2, ..., 11-j may be used in order to relay several downlink channels. The individual ones of the subsets of the antenna elements 11-1, 11-2, ... 11-j may be, without any limitation, used for creating an individual one of downlink channels. The downlink channels may be used for different services being provided to the users of the mobile communication network.

It is to be understood that the uplink beam forming vectors cu-1, cu-2, ..., cu-j and/or the downlink beam forming vectors cd-1, cd-2, ..., cd-j may be applied in a time varying fashion. Therefore the beam shape used for the uplink relaying and/or the beam shape used for the downlink relaying may be varying time. In other words the uplink beam shape and/or the downlink beam shape may be varied "on the fly", i. e. without interrupting the operation of the antenna array 1.

Without any limitation the local knowledge 60 may comprise a distribution 64 of users in the cell 10. It will be readily appreciated by a person skilled in the art that the distribution 64 of users in the cell 10 may comprise an averaging over the distribution 64 of the users within the cell 10. For example near the exit of a railway station a population of users statistically tends to be higher and more fluctuating than within an office building. Likewise during working hours the statistical distribution of users may by higher in an office building than it would be during night times. It may be of interest to provide a high gain beam pattern during night times. Using the high gain beam pattern over night may allow switching of adjacent sectors of the cell 10 as well as sectors of adjacent cells 10. The use of the high gain beam shape at night time would help to save energy with adjacent ones of the cells being switched off. At the same time coverage of both cell sectors of the adjacent cells 10 would be assured by such a strategy. The local network planning module 70 may be used in order to provide a statistic about the distribution 64 of users within the cell 10. The statistic about the distribution 64 of users within the cell 10 may be provided by applying several ones of the uplink beam forming vectors 20u-1, 20u-2, ..., 20u-N to the individual ones of the antenna elements 11-1, 11-2, ... 11-j in order to indentify the direction, and/or the beam shape adapted to statistically collect the largest power of radio signals. Without any limitation the distribution 64 of the users 64 may be provided by the network planning system as will be explained with respect to FIG. 1d.

The local knowledge 60 about the cell 10 may further comprise a statistic of a quality of service provided to the users within the cell 10. The quality of service may be used in order to determine whether the local knowledge 60 used for selecting the individual ones 22u, 22d of the plurality of uplink beam forming vectors 20u-1, 20u-2, ..., 20u-N and the plurality of downlink beam forming vectors 20d-1, 20d-2, ..., 20d-N is still appropriately reflecting the situation within the cell 10. It will be readily appreciated by a person skilled in the art that the local network planning module 70 and additionally or alternatively the network planning system 200 are adapted to learn about changes within the cell 10.

There are several other ways of representing the local knowledge 60 about the cell 10. One possibility to express the local knowledge 60 is to represent the local knowledge 60 by quality parameters. The quality parameters comprise without any limitation at least one of a received signals strength pu-1, pu-2, ..., pu-N for the plurality of uplink beam forming vectors 20u-1, 20u-2, ..., 20u-N, a received signal strength pd-1, pd-2, ..., pd-N for the plurality of downlink beam forming vectors 20d-1, 20d-2, ..., 20d-N, a signal to interference and noise ratio SINR-u1, SINR-u2, ..., SINR-uN for the plurality of uplink beam forming vectors 20u-1, 20u-2, ..., 20u-N, a signal to interference and noise ratio SINR-d1, SINR-d2, ..., SINR-dN for the plurality of downlink beam forming vectors 20d-1, 20d-2, ..., 20d-N, a coverage area 66u-1, 66u-2, ... 66u-N for the plurality of uplink beam forming vectors 20u-1, 20u-2, ..., 20u-N and a coverage area 66d-1, 66d-2, ... 66d-N for the plurality of downlink beam forming vectors 20d-1, 20d-2, ..., 20d-N, a signal to interference and noise ratio SINR-Nu1, SINR-Nu2, ..., SINR-NuN normalized to the coverage area for 66u-1, 66u-2, ..., 66u-N for the plurality of uplink beam forming vectors 20u-1, 20u-2, ..., 20u-N, a signal to interference and noise ratio SINR-Nd1, SINR-Nd2, ..., SINR-NdN normalized to the coverage area for 66d-1, 66d-2, ..., 66d-N for the plurality of downlink beam forming vectors 20d-1, 20d-2, ..., 20d-N. At least one of the antenna array 1, the local network planning module 70 and a network planning system 200 (see below) is adapted to monitor and update the local knowledge 60 about the cell 10; and hence the quality parameters of the cell 10.

A further option of representing the local knowledge 60 may comprise a knowledge about a required transmit power and antenna gain in order to select the most appropriate one of the downlink beam forming vectors 20d-1, 20d-2, ..., 20d-N. The knowledge about the required transmit power and antenna gain may be, for example, based on equivalent isotropically radiated power (EIRP) of the antenna elements 11-1, 11-2, ..., 11-j, as is known in the art. Taking the EIRP into account may provide greater efficiency in using power amplifiers. This is because the EIRP provides larger headroom for the power amplifiers. One may be able to prevent all of the power amplifiers running at full load. It is to be understood that the concept of the local knowledge 60 as mentioned herein may always comprise taking into account the EIRP of the antenna elements 11-1, 11-2, ..., 11-j.

The monitoring of the local knowledge 60 about the cell 10 offers new possibilities to network providers for optimizing the quality of service provided to the customers within the cell 10 of the communication network 500. The monitoring of the local knowledge 60 may be achieved by observing and monitoring the quality parameters of the cell 10.

It will be appreciated by a person skilled in the art that the antenna array 1 may as well be used in a communication network 500 comprising a plurality of the antenna elements 1-1, 1-2, ..., 1-N. The monitoring in the communication network 500 may comprise as well a monitoring of the local knowledge 60 and hence the quality parameters for each one of antenna arrays 1-1, 1-2, ..., 1-N. Furthermore a calculation of a spatial signal covariance matrix may be used in order to form the beam patterns of the plurality of uplink beam forming vectors 20u-1, 20u-2, ..., 20u-N and the plurality of downlink beam forming vectors 20d-1, 20d-2, ..., 20d-N by extracting spatial information from a spatial covariance matrix. A covariance matrix will comprise correlations between an individual one of the antenna elements 11-1, 11-2, ... 11-j, as displayed in FIG. 1a. The spatial covariance matrix will on its diagonal comprise the auto-correlations of a radio signal received at an individual one of the antenna elements 11-1, 11-2, ..., 11-j. Cross-correlations from one antenna element 11-1, 11-2, ..., 11-j to another antenna element 11-1, 11-2, ..., 11-j will be represented on off diagonal positions. The covariance matrix may be used to derive those uplink beam forming vectors 20u-1, 20u-2, ..., 20u-N yielding a minimal cross-correlation between the individual ones of the antenna elements 11-1, 11-2, ... 11-j. The covariance analysis is known the field and shall not be discussed any further.

A person skilled in the art will further appreciate that it may be convenient to store a plurality of the uplink beam forming vectors 20u-1, 20u-2, . . . , 20u-N, represented by the uplink factors cu-1, cu-2, . . . , cu-j, for each one of the antenna elements 11-1, 11-2, . . . 11-j in a storage or memory of the antenna array 1. Likewise the downlink beam forming vectors 20d-1, 20d-2, . . . , 20d-N, represented by the downlink factors cd-1, cd-2, . . . , cd-j for each one of the antenna elements 11-1, 11-2, . . . 11-j, may be stored in the storage of the antenna array 1. The number of beam forming vectors available to the antenna array 1 is substantially limited by the size of the storage provided with the antenna array 1.

It may be convenient to have a set of pre-calculated uplink beam forming vectors 20u-1, 20u-2, . . . , 20u-N and a pre-calculated set downlink beam forming vectors 20d-1, 20d-2, . . . , 20d-N already present within the antenna array 1. It may be of interest to select the pre-calculated uplink beam forming vectors and the pre-calculated downlink beam forming vectors such that most of the scattering situations are already covered. Furthermore the antenna array 1 may be adapted to calculate new beam forming vectors based on the covariance matrix as discussed above.

Without any limitation it is possible for the individual ones 22u-1, 22u-2, . . . , 22u-N of the plurality of uplink beam forming vectors 20u-1, 20u-2, . . . , 20u-N and the individual ones 22d-1, 22d-2, . . . , 22d-N of the plurality of downlink beam forming vectors 20d-1, 20d-2, . . . , 20d-N to substantially be identical. The plurality of uplink beam forming vectors 20u-1, 20u-2, . . . , 20u-N and the plurality of downlink beam forming vectors 20d-1, 20d-2, . . . , 20d-N may comprise beam patterns with varying tilt angles Θ, as explained with respect to FIG. 1a.

Obviously a flexibility of beam forming vectors in the azimuth direction will be increased when there is provided more than one antenna element 11-1 in the horizontal direction. If for example the antenna array 1 only comprises a 1×2 matrix, for example comprising the antenna elements 11-3, and 11-4 as shown in FIG. 1a, the flexibility in reaching the variable azimuth directions indicated by P1 and P2 and P6 and P5 will be reduced. One may therefore either provide n×m matrix with n and m equal or greater 2. Alternatively one may provide an n×1 matrix which is capable of being turned from a vertical direction to a horizontal direction in order to provide those beam forming vectors providing the beam variation of the azimuth direction, as explained above.

It is to be understood that the plurality of uplink beam forming vectors 20u-1, 20u-2, . . . , 20u-N may produce beam patterns of a first polarization 24u and the plurality of downlink beam forming vectors 20d-1, 20d-2, . . . , 20d-N may produce a second polarization 24d. The first polarization 24u and the second polarization 24d may substantially be orthogonal. The first polarization 24u and the second polarization 24d may further help reducing the cross-correlations within the covariance matrix.

It shall be understood that the cells 10 and the antenna array 1 of FIGS. 1b and 1c as discussed, may be used to form a communication network 500 as shown in FIG. 1d comprising a plurality of the cells 10-1, 10-2, . . . , 10-N. Each one of the cells 10-1, 10-2, . . . , 10-N comprises at least one antenna array 1-1, 1-2, . . . , 1-N. In FIG. 1d there are only four cells 10-1,-10-2, . . . , 10-N depicted. Of course the communication network 500 may be extended to any integral number of the cells N. Likewise, FIG. 1d only depicts four different ones of the antenna arrays 1-1, 1-2, 1-3, . . . 1-N. Without any limitation more than one of the antenna arrays 1-1, 1-2. . . . , 1-N may be present within each one of the cells 10-1, 10-2, . . . , 10-N. Each one of the antenna arrays 1-1, 1-2, 1-3. . . , 1-N comprises a link 50-1, 50-2, . . . , 50-n. The link 50-1, 50-2, . . . 50-N is adapted to accept the plurality of uplink beam forming vectors 20u-1, 20u-2, . . . 20u-n and the plurality of downlink beam forming vectors 20d-1, 20d-2, . . . , 20d-N, as discussed before.

The plurality of uplink beam forming vectors 20u-1, 20u-2, . . . , 20u-N and the plurality of downlink beam forming vectors 20d-1, 20d-2, . . . , 20d-N may by provided by a network planning system 200 as shown in FIG. 1d. Likewise and without any limitation each one of the antenna arrays 1-1, 1-2, 1-3. . . , 1-N may be provided with a local network planning module 70-1, 70-2, . . . , 70-N, providing the plurality of uplink beam forming vectors 22u-1, 22u-2, . . . , 20u-N and the plurality of downlink beam forming vectors 20d-1, 20d-2, . . . , 20d-N to each one of the antenna elements 1-1, 1-2, . . . , 1-N. . The local network planning modules 70-1, 70-2, . . . , 70-N may be coupled to the network planning system 200 in order to maintain the communication network 500 not only based on the local knowledge 60-1, 60-2, . . . , 60-N about the cells 10-1, 10-2, 10-3. . . , 10-N but also based on a local knowledge 600 about the network 500.

Within FIG. 1d the network planning system 200 provides the individual ones of the plurality of uplink beam forming vectors 22u-1, 22u-2, . . . , 22u-N and/or the individual ones of the plurality of downlink beam forming vectors 22d-1, 22d-2, . . . , 22d-N to the antenna arrays 1-1, 1-2, . . . , 1-N. Without any limitation the network planning system 200 may as well provide the plurality of uplink beam forming vectors 20u-1, 20u-2, . . . , 20u-N and/or the plurality of downlink beam forming vectors 20d-1, 20d-2, . . . , 20d-N to the antenna arrays 1-1, 1-2, . . . , 1-N using the links 50-1, 50-2, . . . , 50-N. The individual ones of the plurality of uplink beam forming vectors 22u-1, 22u-2, . . . , 22u-N and/or the individual ones of the plurality of downlink beam forming vectors 22d-1, 22d-2, . . . , 22d-N may then be selected in response to a control signal forwarded to the links 50-1, 50-2, . . . , 50-N, triggering the selection of the individual ones 22u-1, 22u-2, . . . , 22u-N of the plurality of uplink beam forming vectors 20u-1, 20u-2, . . . , 20u-N and/or the individual ones 22d-1, 22d-2, . . . , 22d-N of the plurality of downlink beam forming vectors 20d-1, 20d-2, . . . , 20d-N at the antenna arrays 1-1, 1-2, 1-3. . . , 1-N, for example, using the local network planning modules 70-1, 70-2, . . . , 70-N.

It is to be understood, that the network planning system 200 is adapted to independently select the individual ones 22u-1, 22u-2, . . . , 22u-N of the plurality of uplink beam forming vectors 20u-1, 20u-2, . . . , 20u-N for the plurality of antenna arrays 1-1, 1-2, . . . , 1-N of the communication network 500. The selecting of the individual ones 22u-1, 22u-2, . . . , 22u-N the pluralities of uplink beam forming vectors 20u-1, 20u-2, . . . , 20u-N, correspond to providing the uplink factors cu-1, cu-2, . . . , cu-j to each one of antenna elements 11-1, 11-2, . . . , 11-j of the antenna arrays 1-1, 1-2, . . . , 1-N of the communication network 500. Without any limitation the network planning system 200 may only provide the individual ones 22u-1, 22u-2, . . . , 22u-N of the uplink beam forming vectors 20u-1, 20u-2, . . . , 20u-N to only some of the antenna elements 1-1, 1-2, 1-3. . . , 1-N of the network 500. The network planning system 200 is further adapted to independently select the individual ones 22d-1, 22d-2, . . . , 22d-N of the plurality of downlink beam forming vectors 20d-1, 20d-2, . . . , 20d-N for the antenna arrays 1-1, 1-2, . . . , 1-N of the communication network 500. The independently selecting of the individual ones 22d-1, 22d-2, . . . , 22d-N of the plurality of downlink beam forming vectors 20d-1, 20d-2, . . . , 20d-N for the antenna arrays 1-1, 1-2, . . . , 1-N corresponds to providing the downlink factors cd-1, cd-2, ..., cd-j for the antenna elements 11-1, 11-2, ..., 11-j, for each one of the antenna arrays 1-1, 1-2, ..., 1-N. Without any limitation the network planning system 200 may only provide the individual ones 22d-1, 22d-2, ..., 22d-N of the downlink beam forming vectors 20d-1, 20d-2, ..., 20d-N to only some of the antenna elements 1-1, 1-2, 1-3..., 1-N of the network 500. The network planning system 200 may use a local knowledge 600 about the network 500 for the selecting of the individual ones 22u-1, 22u-2, ..., 22u-N of the plurality of uplink beam forming vectors 20u-1, 20u-2, ... 20u-N and the individual ones of the plurality of downlink beam forming vectors 22d-1, 22d-2, ..., 22d-N of the plurality of downlink beam forming vectors 20d-1, 20d-2, ..., 20d-N.

It is to be understood that the local knowledge 600 about the network 500 does not only comprise the local knowledge 60 about an individual one of the cells 10-1, 10-2, ..., 10-N of the network 500. In contrast; the local knowledge 600 about the network 500 may comprise a local knowledge 60-1, 60-2, ..., 60-N for all the cells 10-1, 10-2, ..., 10-N of the communication network 500. The communication network 500 may comprise a divider module 655. The divider module 655 is adapted to provide the local knowledge 60-1, 60-2, ..., 60-N of the cells 10-1, 10-2, ..., 10-N of the network 500 based on the local knowledge 600 about the network 500. The local knowledge 600 about the network 500 may comprise a topology of the network 500. The topology of the network 500 may be defined as a topology 62-1, 62-2, ..., 62-n (not shown) of the cells 10-1, 10-2, ..., 10-N. Furthermore the local knowledge 600 about the network 500 may comprise a distribution 64-1, 64-2, ..., 64-N of users within the cells 10-1, 10-2, ..., 10-N. The local knowledge 600 may further be expressed as the quality parameters of the cells 10-1, 10-2, ..., 10-N of the network 500 as defined above.

The local knowledge divider module 655 provides the local knowledge 60-1, 60-2, ..., 60-N of the cells 10-1, 10-2, ..., 10-N to the network planning system 200. Without any limitation the local knowledge divider module 655 may be incorporated in the network planning system 200.

Figure 1E:
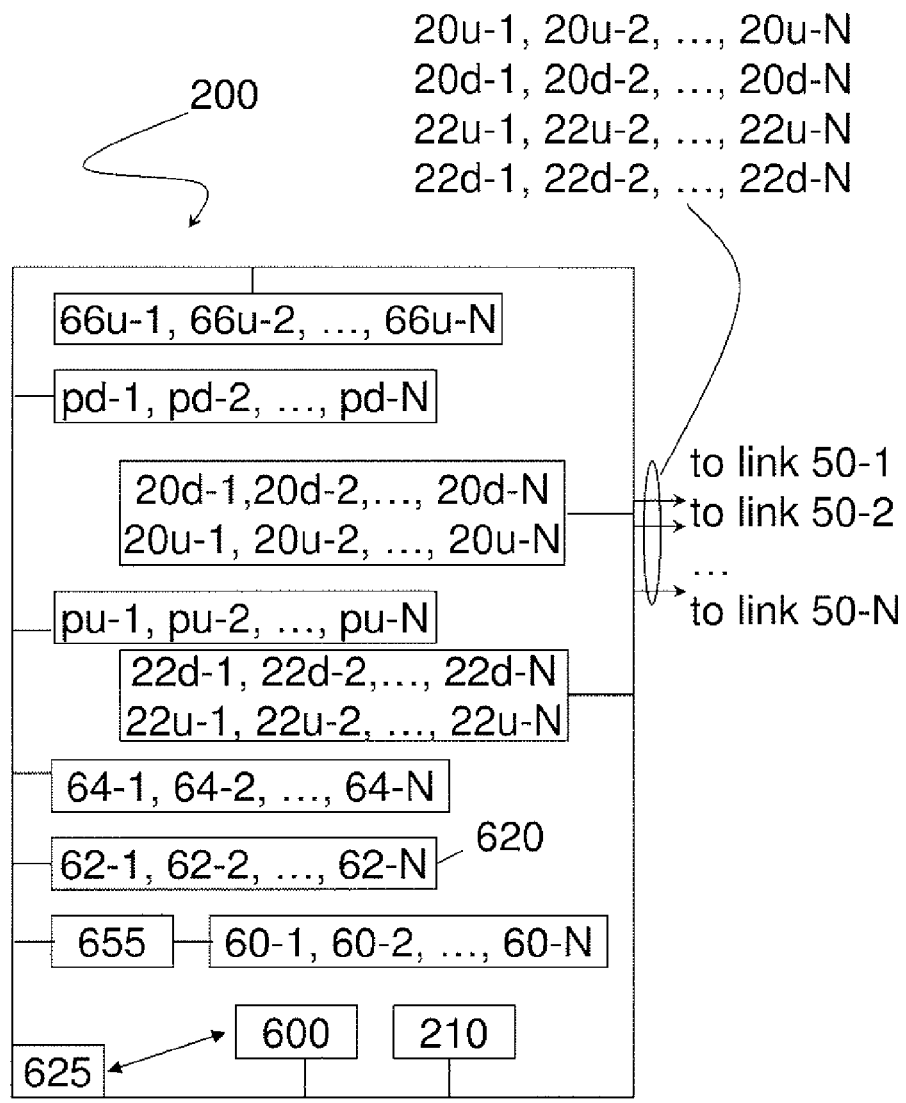
FIG. 1e shows details of the network planning system.

FIG. 1e shows details about the network planning system 200. The network planning system 200 is adapted to provide for at least one of the antenna arrays 1-1, 1-2, 1-3 ..., 1-N the plurality of uplink beam forming vectors 20u-1, 20u-2, ..., 20u-N, the plurality of downlink beam forming vectors 20d-1, 20d-2, ..., 20d-N, the individual ones of 22u-1. 22u-2, ..., 22u-N of the plurality of uplink beam forming vectors 20u-1, 20u-2, ..., 20u-N, and the individual ones 22d-1, 22d-2, ..., 22d-N of the plurality of downlink beam forming vectors 20d-1, 20d-2, ..., 20d-N. The aspect of the network planning system 200 as shown in FIG. 1e is adapted to provide the beam forming vectors to the links 50-1, 50-2, ..., 50-N of the cells 10-1, 10-2, ..., 10-N of the network 500. As mentioned previously the individual ones 22u-1. 22u-2, ..., 22u-N of the plurality of uplink beam forming vectors 20u-1, 20u-2, ..., 20u-N are represented by the uplink factors cu-1, cu-2, ..., cu-j for each one of the antenna elements 11-1, 11-2, ..., 11-j of the antenna arrays 1-1, 1-2, ..., 1-N. Likewise the individual ones of the individual ones 22d-1, 22d-2, ..., 22d-N of the plurality of downlink beam forming vectors 20d-1, 20d-2, ..., 20d-N for the antenna arrays 1-1, 1-2, ..., 1-N are represented by the downlink sectors cd-1, cd-2, ..., cd-j for each one of the antenna elements 11-1, 11-2, ..., 11-j of the antenna arrays 1-1, 1-2, ..., 1-N. Therefore it may be sufficient to provide the complex factors cu-1, cu-2, ..., cu-j and cd-1, cd-2, ..., cd-j for each one of the antenna elements 11-1, 11-2, ..., 11-j for the antenna arrays 1-1, 1-2, ..., 1-N. All entities of the network planning system 200 are coupled to each other and in communication with each other. The network planning system 200 uses the local knowledge 600 about the network 500.

The local knowledge 600 about the network 500 may be expressed in terms of quality parameters of a plurality of antenna arrays 1-1, 1-2, 1-3. ..., 1-N. For each one of the antenna arrays 1-1, 1-2, 1-3. ..., 1-N the quality parameters comprise without any limitation at least one of a received signals strength pu-1, pu-2, ..., pu-N for the plurality of uplink beam forming vectors 20u-1, 20u-2, ..., 20u-N, a received signal strength pd-1, pd-2, ..., pd-N for the plurality of downlink beam forming vectors 20d-1, 20d-2, ..., 20d-N, a signal to interference and noise ratio SINR-u1, SINR-u2, ..., SINR-uN for the plurality of uplink beam forming vectors 20u-1, 20u-2, ..., 20u-N, a signal to interference and noise ratio SINR-d1, SINR-d2, ..., SINR-dN for the plurality of downlink beam forming vectors 20d-1, 20d-2, ..., 20d-N, the coverage area 66u-1, 66u-2, ... 66u-N for the plurality of uplink beam forming vectors 20u-1, 20u-2, ..., 20u-N and a coverage area 66d-1, 66d-2, ... 66d-N for the plurality of downlink beam forming vectors 20d-1, 20d-2, ..., 20d-N, a signal to interference and noise ratio SINR-Nu1, SINR-Nu2, ..., SINR-NuN normalized to the coverage area for 66u-1, 66u-2, ..., 66u-N for the plurality of uplink beam forming vectors 20u-1, 20u-2, ..., 20u-N, a signal to interference and noise ratio SINR-Nd1, SINR-Nd2, ..., SINR-NdN normalized to the coverage area for 66d-1, 66d-2, ..., 66d-N for the plurality of downlink beam forming vectors 20d-1, 20d-2, ..., 20d-N.

At least one of the antenna arrays 1-1, 1-2, ..., 1-N, the local network planning modules 70-1, ..., 70-N and the network planning system 200 is adapted to monitor and update the local knowledge 600 about the network 500 and hence the quality parameters of the cell 10-1, 10-2, ..., 10-N.

The network planning system 200 further comprises an update module 620 for updating the local knowledge 600 about the communication network 500.

The local knowledge divider module 655 is adapted to divide the local knowledge 600 about the network 500 into the local knowledge 60-1, 60-2, ..., 60-N of the cells 10-1, 10-2, ..., 10-N of the network 500. From the local knowledge 600 about the network 500 a local knowledge 60-1, 60-2, ..., 60-N about a topology 62-1, 62-2, ..., 62-N may be provided. Furthermore, a distribution 64-1, 64-2, ..., 64-N of the users within the cells 10-1, 10-2, ..., 10-N of the network 500 is provided. Furthermore, from the local knowledge 600 a coverage area 66u-1, 66u-2, ..., 66u-N for the plurality of uplink beam forming vectors 20u-1, 20u-2, ..., 20u-N as well as a coverage area 66d-1, 66d-2, ..., 66d-N for the downlink beam forming vectors 20d-1, 20d-2, ..., 20d-N is provided. The network planning system 200 is further adapted to select the plurality of uplink beam forming vectors 20u-1, 20u-2, ..., 20u-N and the plurality of downlink beam forming vectors 20d-1, 20d-2, ..., 20d-N independently, as disclosed earlier.

The individual ones 22u-1, 22u-2, ..., 22u-N of the plurality of uplink beam forming vectors 20u-1, 20u-2, ..., 20u-N and the individual ones 22d-1, 22d-2, ..., 22d-N of the downlink beam forming vectors 20d-1, 20d-2, ..., 20d-N are provided by the network planning system 200. The network planning system 200 may further provide a received power in the uplink pu-1, pu-2, ..., pu-N and a received power in the downlink pd-1, pd-2, ..., pd-N. Obviously the received power in the downlink would be measured by the handsets of the users, as is known in the art.

In FIG. 1e elements of the network planning system 200 are displayed as communicatively coupled to each other. It is to be understood that the network planning system 200 may be according to one aspect implemented as an individual unit. Without any limitations elements of the network planning system 200 may additionally or alternatively be implemented as part of one of the antenna arrays 1-1, 1-2, . . . , 1-N. A person skilled in the art will readily understand the freedom in design of the network planning system 200 with respect to whether the network planning system 200 is a distributed system or a central system.

Figure 1F:
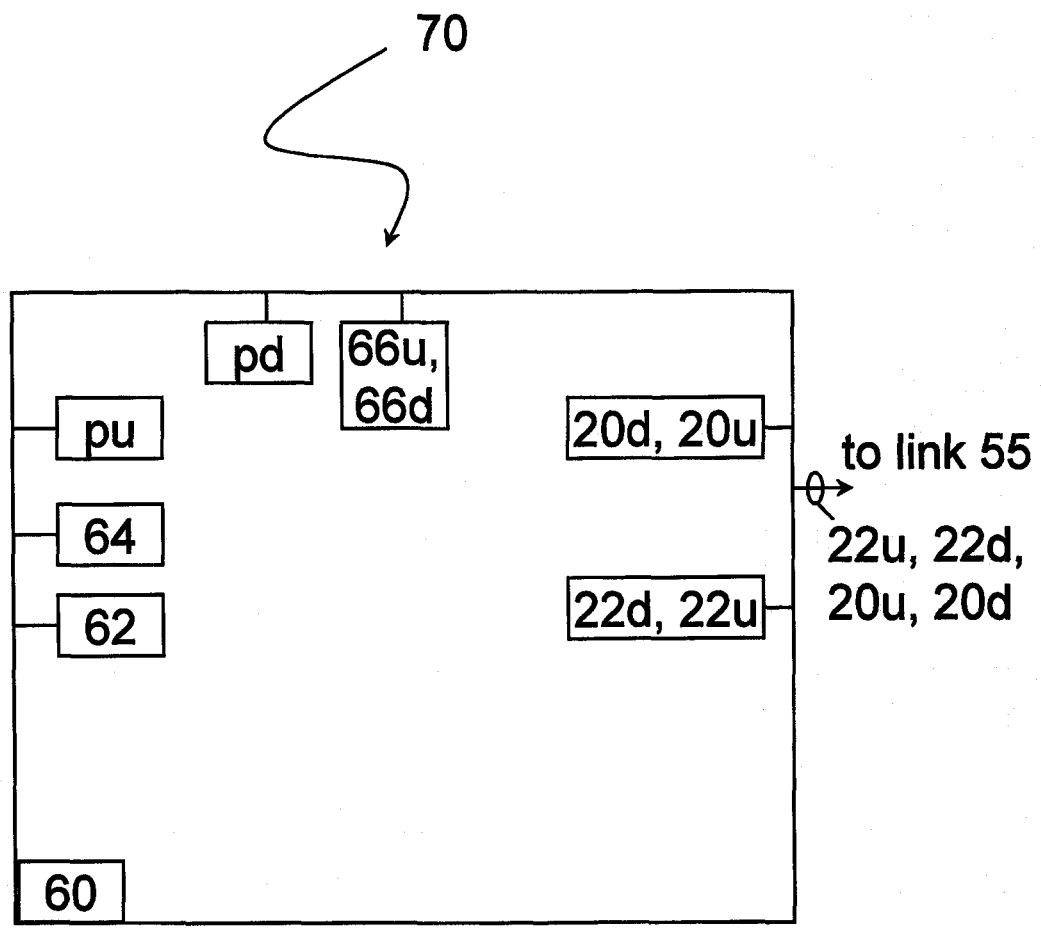
FIG. 1f shows a local network planning module.
Figure 1G:
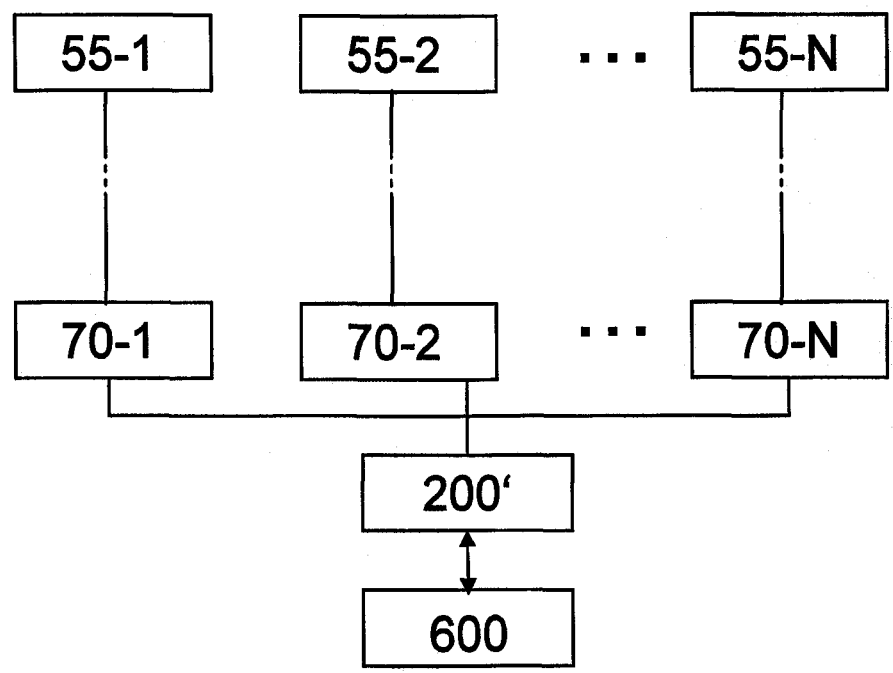
FIG. 1g shows a network planning system using a local knowledge about the network to control a plurality of local network planning modules.

FIG. 1f shows an example of the local network planning system 70 that may be implemented in the antenna array 1. The local network planning module 70 comprises the local knowledge 60 about the cell 10. The local network planning module 70 may be adapted to derive a topology 62 of the cell 10 from the local knowledge 60. The local network planning module 70 may further be adapted to provide a distribution 64 of users within the cell 10 based on the local knowledge 60. The local knowledge module 64 may further be adapted to provide a received power for the plurality of uplink beam forming vectors pu. The local network planning module 70 may further be adapted to provide a receive power pd for the pd for the downlink beam forming vectors 20d, the receive power pd being typically determined at the handset of the users. Likewise a coverage area 66u for uplink beam forming vectors 20u of may be provided together with the coverage area 66d for the uplink beam forming vectors 20d. The local planning module 70 is coupled to the link 55 of the antenna array 1 in order to provide the plurality of uplink beam forming vectors 20u and the plurality of downlink beam forming vectors 20d together with the individual one 22u of uplink beam forming vectors 20u and the individual one 22d of the downlink beam forming vectors 20d to the antenna array 1. The local knowledge 60 may further be derived from the covariance analysis as explained above. The appropriate beam forming vector will be used for relaying in operation of the antenna array 1 by providing the beam forming vectors to the link 55.

FIG. 1f shows an aspect of a distributed network planning system 200' which is coupled to the local network planning modules 70-1, 70-2, . . . , 70-N as shown in FIG. 1f. The distributed network planning module 200' will use the communication with the local network planning modules 70-1, 70-2, . . . , 70-N of the cells 10-1, 10-2, . . . , 10-N of the network 500 in order to update a local knowledge 600 about the network 500. Local knowledge 600 about the network 500 may be used by the distributed network planning system 200' in order to provide the local network planning module 70-1, 70-2, . . . , 70-N with the required information so that of the local network planning modules 70-1, 70-2, . . . , 70-N are adapted to provide the plurality of uplink beam forming vectors 22u-1, 22u-2, . . . , 22u-N and the plurality of downlink beam forming vectors 22d-1, 22d-2, . . . , 22d-N to the cells 10-1, 10-2, . . . , 10-N of the communication network 500 using the local knowledge 600 about the communication network 500.

It is to be understood that the antenna array 1 may as well be implemented at least partly as a computer program product such that a processor is adapted to provide the functionality of the antenna array 1. Likewise the network planning system 200 may be provided at least partly as a computer program comprising instructions for a processor to provide the functionality of the network planning system 200 or the distributed network planning module 200'. It is further to be understood that the network planning system 200 may be used independently from the antenna arrays 1 or in combination with the antenna arrays 1-1, 1-2, 1-3. . . , 1-N.

The present disclosure provides a communication network 500 comprising the plurality of the antenna arrays 1-1, 1-2, . . . , 1-N and the network planning system 200 as explained above.

The present disclosure further provides a method 1000 for relaying radio signals into a cell 10 of a communication network 500.

Figure 2A:
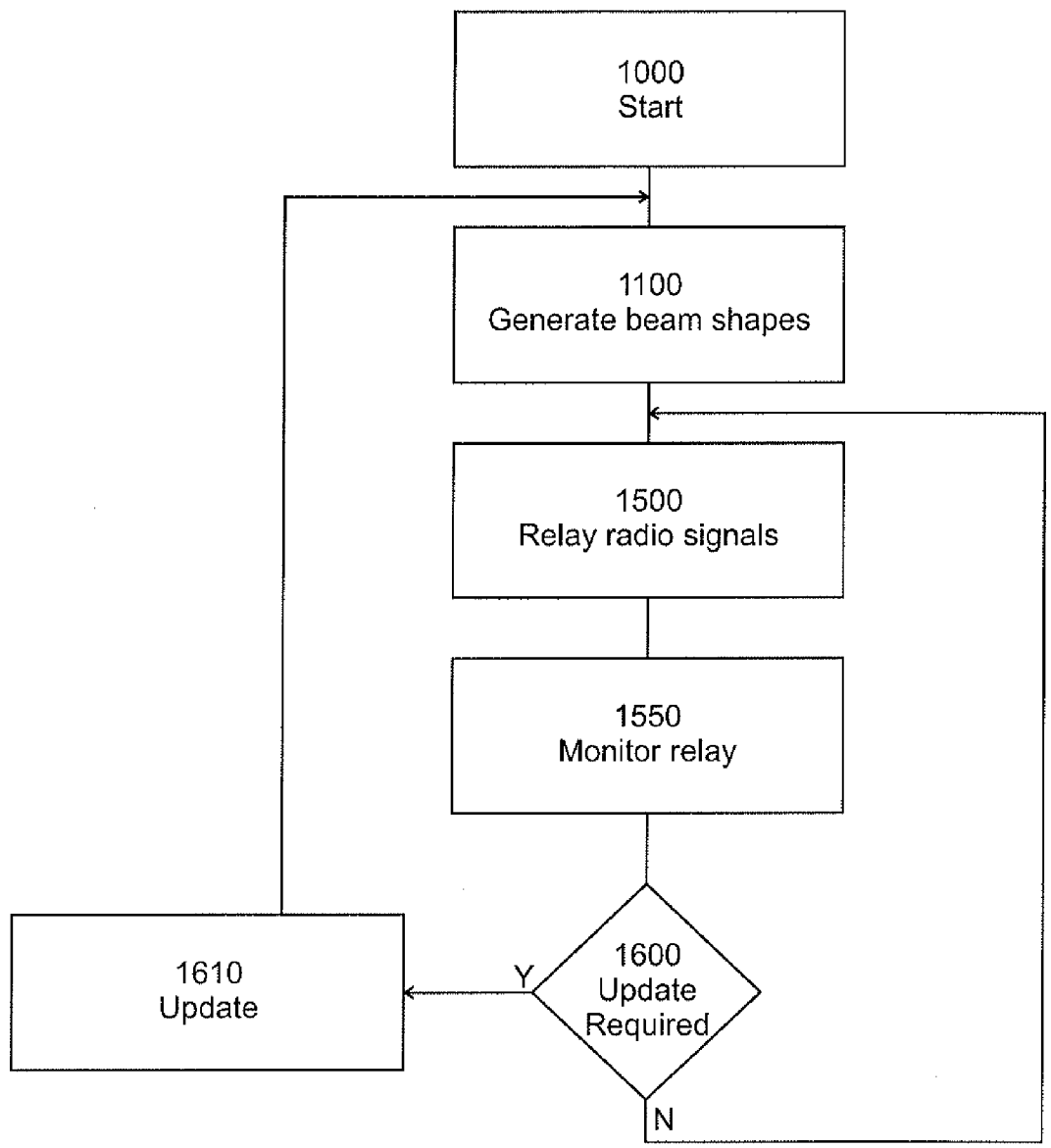
FIG. 2a shows a method for relaying radio signals into a cell of a communication network.

FIG. 2a depicts a flow chart of a method of 1000 for relaying radio signals into the cell 10 of the communication network 500. The method 1000 comprises a step 1100 of generating beam shapes for a relaying of radio signals into a cell of the communication network 500 and a step of relaying 1500 radio signals into the cell 10. It is to be understood that the step 1100 of generating the beam shapes for a relaying may as well be carried out as an individual method 1100 of generating beam shapes for a relaying into a cell 10 of the communication network 500.

The method 1000 may use a local knowledge 60 about the cell 10. The local knowledge 60 about the cell 10 may be used for the generating 1100 of the beam shapes for the relaying into the cell 10 and/or the relaying 1500 of the radio signals into the cell 10. The method 1000 further comprises a step 1550 of monitoring the relaying 1500 of the cell 10.

In a step 1600 it is determined whether a step 1610 of updating of the local knowledge 60 about the cell 10 is required. If no updating step 1610 of the local knowledge 60 is required, the method 1000 returns to the step 1500 of relaying the radio signals into the cell 10. It is to be understood that the updating 1610 of the local knowledge 60 may comprise a change of the selected one 22d of the plurality of uplink beam forming vectors and a change of the selected one 22u of the plurality of downlink beam forming vectors. The updating of the selected one 22u of the plurality of uplink beam forming vectors 20u and the updating of the selected one 22d of the downlink beam forming vectors 20d may be achieved by the covariance analysis of the cross-correlations between individual ones of the antenna elements 11-1, 11-2, . . . , 11-j, as described above. The spatial covariance matrix may be used in order to derive optimally suited uplink beam forming vectors and/or optimally suited downlink beam forming vectors for the antenna array 1. The step of updating 1610 may further comprise providing a new plurality of uplink beam forming vectors 20u-1, 20u-2, . . . , 20u-N and a new plurality of downlink beam forming vectors 20d-1, 20d-2, . . . , 20d-N. If the step 1600 confirms that an updating 1610 of the local knowledge 60 is required, the step of updating 1610 the local knowledge 60 is carried out and the method 1000 returns to the step of generating 1100 the beam shapes for the relaying into the cell 10.

Figure 2B:
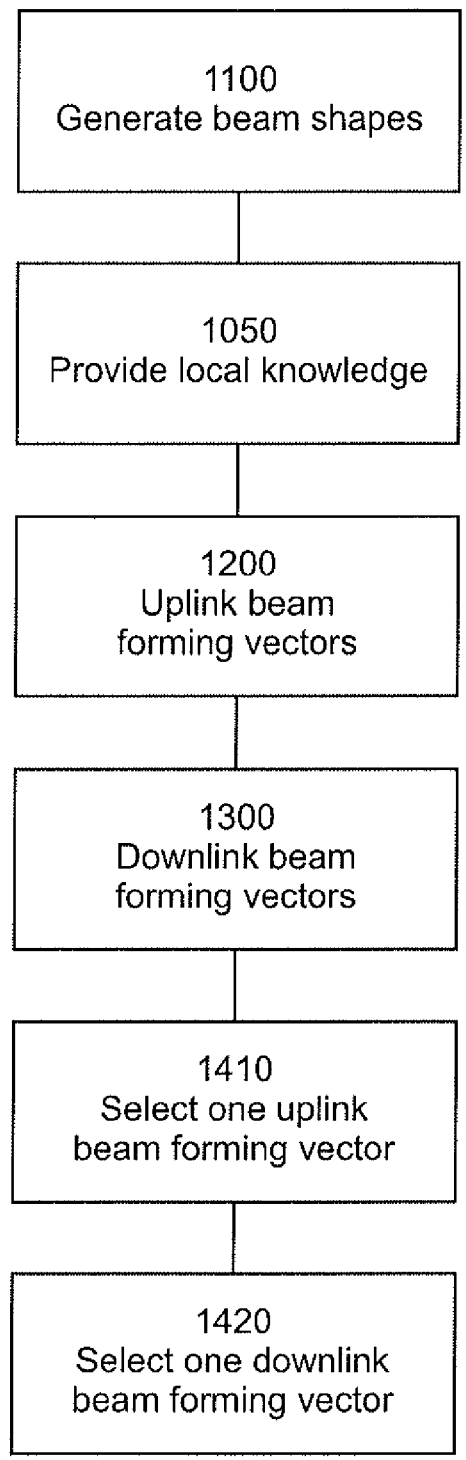
FIG. 2b shows details of a step of generating beam shapes for a relaying into the cell of the communication network.

FIG. 2b shows details of the generating 1100 of the beam shapes for the relaying into the cell 10. As mentioned previously the generating 1100 of the beam shapes for the relaying into the cell 10 may as well be carried out as an individual method 1100. The generating 1100 comprises a providing 1050 of the local knowledge 60 about the cell 10. The local knowledge 60 about the cell 10 may be provided by the local network planning module 70 and/or the network planning system 200 as explained above. The method further comprises a providing 1200 of a plurality of uplink beam forming vectors 20u. The plurality of uplink beam forming vectors is selectable as an uplink beam shape for an uplink relaying. It is to be understood that the steps 1050, 1200 of selecting the pluralities of uplink and downlink beam forming vectors 20u, 20d may use the local knowledge 60. For example the local knowledge 60 about the cell 10 may be used in order to calculate a beam forming shape that is most likely suitable to optimally cover the segment of the cell 10 pertaining to the antenna array 1. Furthermore a statistic about a distribution of users 64 may be used in order to derive the most suitable beam forming shapes for relaying into the cell 10, as explained above.

Without any limitation the local knowledge 60 may represented by the quality parameters of the cells 10 as defined above.

In a step 1300 the plurality of downlink beam forming vectors 20d is provided. The plurality of downlink beam forming vectors 20d is selectable as a downlink beam shape for a downlink relaying. The local knowledge 60 about the cell 10 may be used for the selecting of the individual one 22d of the downlink beam forming vectors 20d. In a step 1410 an individual one 22u of the plurality of uplink beam forming vectors 20u is selected. The step 1300 may involve using the local knowledge 60 about the cell 10. In a step 1420 an individual one 22d of the plurality of downlink beam forming vectors 20d is selected using the local knowledge 60 about the cell 10. As explained before the selecting 1410 the individual one 22u of the uplink beam forming vectors 20u is independent from the selecting 1420 of the individual one 22d of the plurality of downlink beam forming vectors 20d.

Figure 2C:
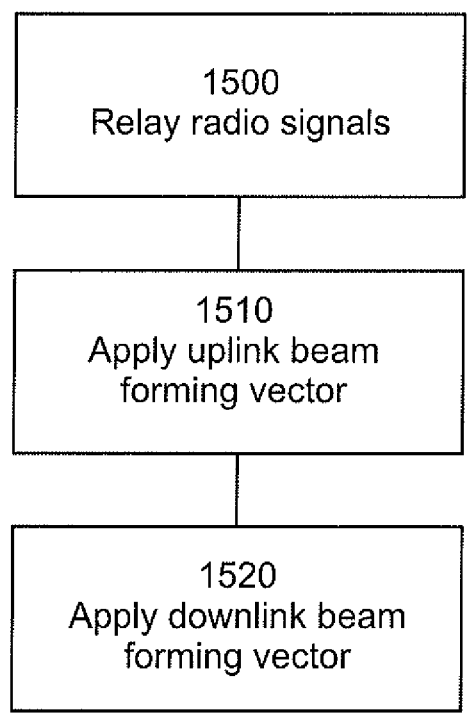
FIG. 2c shows details about a step of relaying the radio signals into the cell of the communication network.

FIG. 2c shows details of the step 1500 of relaying radio signals into the cell 10. The step 1510 comprises applying the selected one 22u of the plurality of uplink beam forming vectors 20u to the antenna array 1. The applying of the selected one 22u of the plurality of uplink beam forming vectors 20-u to the antenna array 1 comprises applying the uplink factors cu-1, cu-2, . . . , cu-j to the antenna elements 11-1, 11-2, . . . , 11-j of the antenna array 1. The step 1520 comprises an applying of the selected one 22u of the plurality of downlink beam forming vectors 20d to the antenna array 1. The applying 1520 of the selected one 22u of the plurality of downlink beam forming vectors 20d comprises applying the downlink factors cd-1, cd-2, . . . , cd-j to the antenna element 11-1, 11-2, . . . , 11-j of the antenna array 1. The selected one 22u of the plurality of uplink beam forming vectors 20u and/or the selected one 22d of the plurality of downlink beam forming vectors 20d may be provided to the link 55 in order to be applied to the antenna array 1. The beam forming vectors arriving at the link 55 will cause an appropriate phase difference and amplitude weighting between individual antenna elements 11-1, 11-2, . . . , 11-j of the antenna array 1. The providing of phase differences between antenna elements 11-1, 11-2, . . . , 11-j and the amplitude weighing between the antenna elements as such is known in the art. It will be appreciated by a person skilled in the art that the present disclosure provides a substantially increased freedom in the applying of the phase differences and amplitude weightings to the antenna elements 11-1, 11-2, . . . , 11-j, as no passive network is used for providing the amplitude and phase changes. The present disclosure provides a substantial advantage over the prior art due to the increased liberty in selecting the phase changes and amplitude weightings.

The step 1550 (see FIG. 2a) of monitoring the relaying 1500 of the radio signals into the cell 10 may comprise measuring a received signals strength pu at the antenna array 1 for the plurality of uplink beam forming vectors 20u. Furthermore the monitoring 1550 may comprise at least one of: determining a distribution 64 of user within the cell 10, measuring a received signal strength pu for the plurality of uplink beam forming vectors 20u, measuring a received signal strength for the plurality of downlink beam forming vectors 20d, typically comprising a feedback from the handsets receiving the radio signals relayed by the antenna element 1, further a signal to interference and noise ratio SINR-u for the plurality of uplink beam forming vectors 20u, the signal to interference and noise ratio SINR-d for the plurality of downlink beam forming vectors 20d, a coverage area 66u for the plurality of uplink beam forming vectors 20u, a coverage area 66d for the plurality of downlink beam forming vectors 20d, a normalized signal to interference ratio SINR-nu with respect to the coverage area 66u for the plurality of uplink beam forming vectors 20u, a normalized signal to interference and noise ratio SINR-nd with respect to the coverage area 66d for the plurality of downlink beam forming vectors 20d. The monitoring 1550 may as well comprise a comparison with most recent values for the quality parameters of the cell 10 using the individual one 22u of the plurality of uplink beam forming vectors 20u and the individual one 22d of the plurality of downlink beam forming vectors 20d.

In other words the monitoring 1550 may comprise monitoring at least one of the quality parameters. The monitoring 1550 may further comprise a spatial covariance analysis for the antenna array 1. The covariance analysis may allow providing optimally suited beam forming vectors. Optimally suited beam forming vectors may be construed as a basis set of beam forming vectors reducing the cross-correlations between the antenna elements 11-1, 11-2, . . . , 11-j as far as possible.

The monitoring 1550 of the relaying 1500 may be provided by at least one of the antenna array 1, the network planning system 200 or the local knowledge module 70, as described above. Therefore at least one of the antenna array 1, the local knowledge module 70 and the network planning system 200 will learn during the operation of the antenna array 1 to identify optimal uplink beam forming vectors and downlink beam forming vectors with respect to the quality parameters of the cell 10.

The step 1600 (see FIG. 2a) will check whether values of the quality parameters have dropped below a threshold. If so, the updating will be carried out in the step 1610.

The step 1610 of updating the local knowledge 60 may be carried out subsequently to the checking of the step 1600, if the updating 1610 is required because values of the quality parameters have dropped below a certain threshold, the step of updating 1610 may trigger a change of the individual one 20d of the plurality of uplink beam forming vectors 20u and/or a change of the individual one 22d of the plurality of downlink beam forming vectors 20d. Furthermore it is also possible that the updating 1610 triggers the calculation of a new plurality of uplink beam forming vectors 20u and a new plurality of downlink beam forming vectors 20d. The new plurality of uplink beam forming vectors 20u may be represented by a new set of uplink factors cu-1, cu-2, . . . , cu-j for the antenna elements 11-1, 11-2, . . . , 11-j of the antenna array 1. The new plurality of downlink beam forming vectors 20d may be represented by a new set of downlink factors cd-1, cd-2, . . . , cd-j for the antenna elements 11-1, 11-2, . . . , 11-j of the antenna array 1. Obviously available uplink and downlink beam shapes achievable with the uplink beam forming vectors 20u and the downlink beam forming vectors 20d will reflect transmission characteristics of the antenna array 1 as is known in the art.

Figure 3:
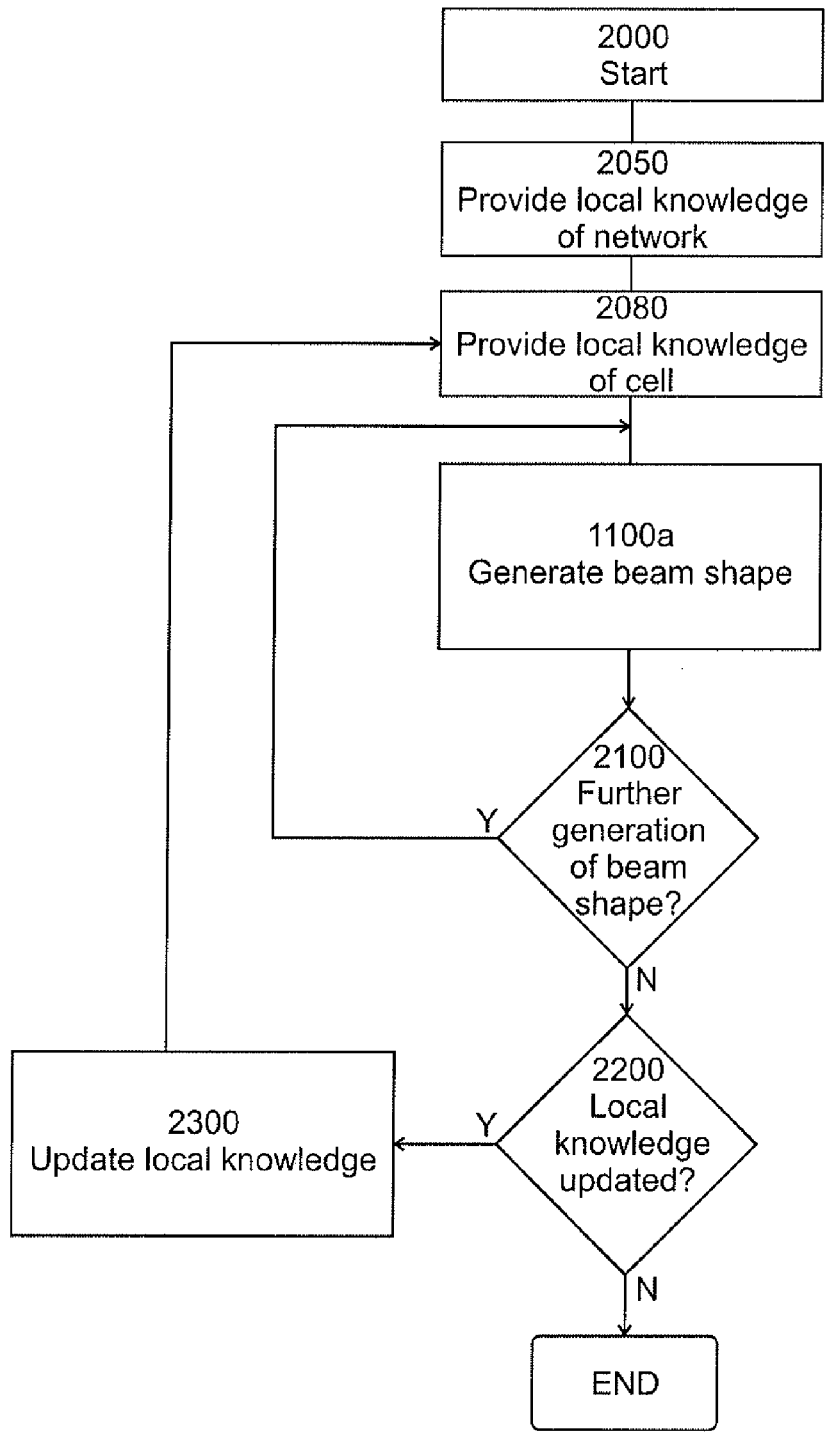
FIG. 3 shows a method for planning a relaying of radio signals into a communication network.

FIG. 3 shows steps of a method 2000 for planning a network 500 comprising a plurality of antenna arrays 1-1, 1-2, . . . , 1-N with a plurality of antenna elements 11-1, 11-2, . . . , 11-j. The antenna arrays 1-1, 1-2, . . . , 1-N are adapted for relaying radio signals into cells 10-1, 10-2, . . . 10-N of the communication network 500 as stated before. The method 2000 comprises a step 2050 of providing a local knowledge 600 about the communication network 500.

In a step 2080 the local knowledge 60-1, 60-2, . . . ; 60-N about the cells 10-1, 10-2, . . . , 10-N is provided based on the local knowledge 600 about the communication network 500. A step 1100a comprises generating beam shapes for a relaying of radio signals into an individual one of the cells 10-1, 10-2, ..., 10-N for at least one of the antenna arrays 1-1, 1-2, ..., 1-N.... The method 2000 of planning the communication network 500 may use the local knowledge 600 about the communication network 500.

In a step 2100 it is checked, whether a generating 1110a of beam shapes for a relaying of radio signals for further cells 10-1, 10-2, ..., 10-N is required. If the generating 1110a of beam shapes for the further cells 10-1, 10-2, ..., 10-N is required, the method returns to the step 1100a of generating beam shapes for the further cells 10-1, 10-2, ..., 10-N of the communication network 500. If no generating 1100a of beam shapes is required for further cells 10-1, 10-2, ..., 10-N, 10-2, ..., 10-N, a step 2200 checks if the local knowledge 60-1, 60-2, ..., 60-N about the cells 10-1, 10-2, ..., 10-N was updated, and will in response update the local knowledge 600 about the communication network 500 in a step 2300.

It is to be understood that the method of network planning 2000 as shown in FIG. 3 divides the communication network 500 into the cells 10-1, 10-2, ... 10-N and plans each one of the cells 10-1, 10-2, ..., 10-N individually. In other words the generating of the beam shapes is carried out for each of the cells 10-1, 10-2, 10-3..., 10-N, individually. It will be readily appreciated by a person skilled in the art that the planning of the communication network 500 could also be carried out on a level of the communication network 500; a dividing 2080 will then be carried out after the planning of the whole network 500 was finished. It appears that a planning, i.e. a generating 1100a of beam shapes for each one of the cells 10-1, 10-2, ..., 10-N is more convenient than planning the whole network 500 as such in a single step. Nevertheless, this is a choice of convenience and there may well be circumstances in which it is of interest to plan the communication network 500 as such in the single step. The step of planning, i.e. generating 1100a the beam shapes for an individual one of the cells 10-1, 10-2, ..., 10-N of the communication network 500 comprises the same steps as the step 1100 depicted in FIG. 2b. Only step 1050 can be omitted, as the providing of the local knowledge 600 about the communication network 500 and the dividing 2080 into the local knowledge 60-1, 60-2, ..., 60-N about the cells 10-1, 10-2, ..., 10-N had already provided the local knowledge 60 about the individual cell 10 being planned, i.e. for which beam shapes are being generated within the step 1100a. All remaining steps are indeed identical as explained with respect to FIG. 2b. If the step 2200 yields that no updating 2300 of the local knowledge 600 about the communication network 500 is required, the method 2000 of planning the communication network 500 is terminated reaching the end state.

Figure 4:
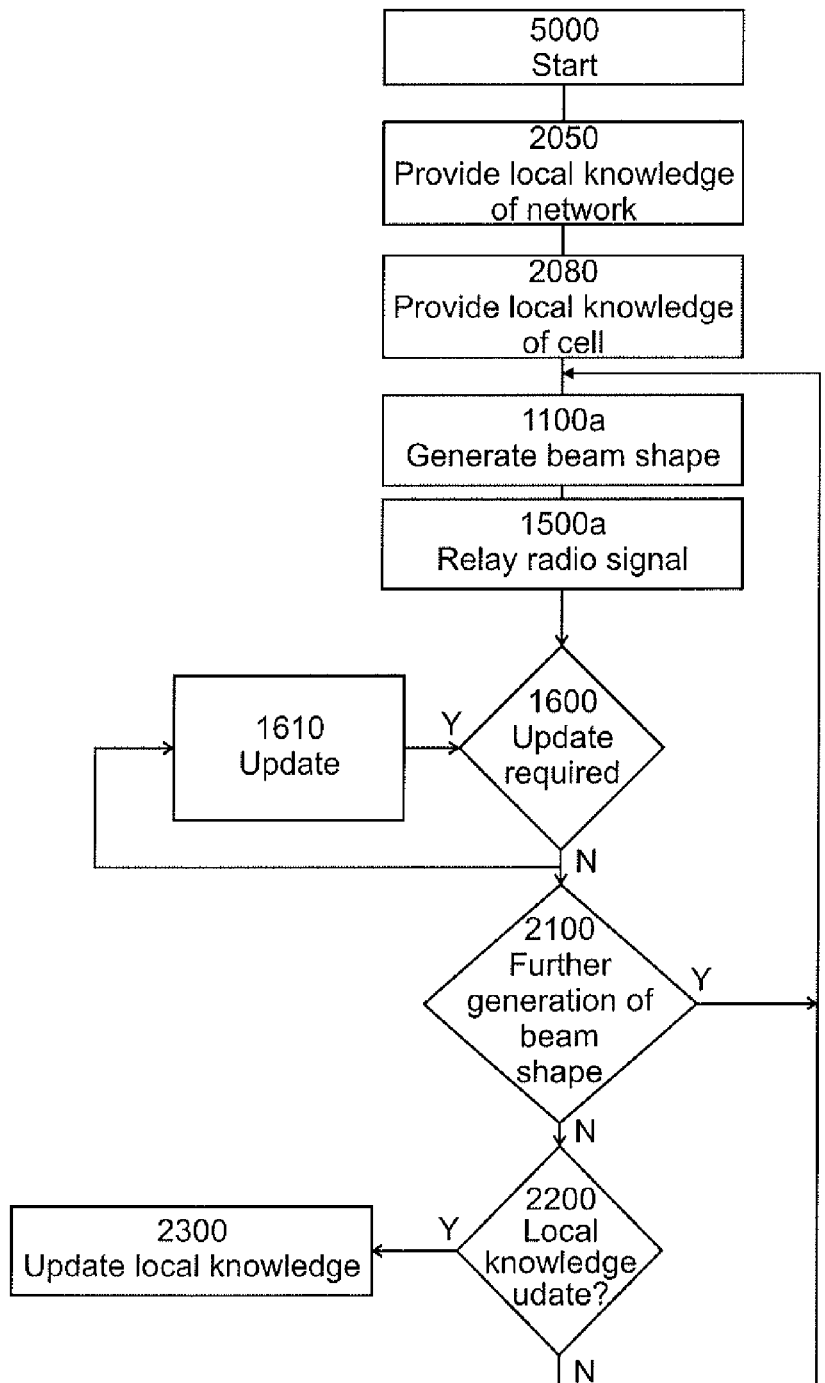
FIG. 4 shows a method for relaying radio signals into a communication network.

FIG. 4 shows a flowchart for a method 5000 for relaying radio signals using generated beam shapes into cells 10-1, 10-2, ..., 10-N of a communication network 500. The communication network 500 comprises the plurality of antenna arrays 1-1, 1-2, ..., 1-N with a plurality of antenna elements 11-1, 11-2, ..., 11-j, as discussed previously. A step 2050 provides local knowledge 600 about the communication network 500. The local knowledge 600 about the communication network 500 may comprise the same quality parameters as discussed with respect to the step 1050 of providing the local knowledge 60 about the cell 10 (see FIG. 2b).

The step 2080 has already been discussed and describes a providing of the local knowledge 60-1, 60-2, ..., 60-N about the cells 10-1, 10-2, ..., 10-N. Within the subsequent step 1100a individual ones of the cells 10-1, 10-2, ..., 10-N of the communication network 500 are planned, i.e. beam shapes are being generated.

A step 1500a comprises a relaying of radio signals into an individual one of the cells 10-1, 10-2, ..., 10-N. The step 1500a is identical to the step 1500 as explained with respect to FIG. 2c dealing with one of the cells 10-1, 10-2, ..., 10-N at a time. In a step 1600 it is checked whether the local knowledge 60-1, 60-2, ..., 60-N of an individual one of the cells 10-1, 10-2, ..., 10-N needs to be updated and subsequently the step 1610 of updating the local knowledge 60-1, 60-2, ... 60-N of the individual one of the cells 10-1, 10-2, ..., 10-N is carried out.

In a step 2100 it is checked whether further cells 10-1, 10-2, ..., 10-N need to be planned, i.e. beam shapes need to be generated for the relaying. If so, the method 2000 returns to the step 1100a as was explained with respect to FIG. 4. In case no further cells 10-1, 10-2, ..., 10-N requiring to be planned, a step 2200 checks, if an updating of the local knowledge 60-1, 60-2, ..., 60-N about the cells 10-1, 10-2, ..., 10-N was carried out for any of the cells 10-1, 10-2, ..., 10-N .... If an updating of the local knowledge 60-1, 60-2, ..., 60-N for an individual one of the cells 10-1, 10-2, ..., 10-N was carried out, the step of updating 2300 the local knowledge 600 about the communication network 500 will be carried out.

It is to be understood that the planning, i.e. the generating of beam shapes 1100a for the the cells 10-1, 10-2, ..., 10-N and the relaying 1500a into the cells 10-1, 10-2, ..., 10-N individually, cell by cell, may be more convenient than planning the communication network 500 and relaying into the cells 10-1, 10-2, ..., 10-N of the communication network 500. Without any limitation it is possible to carry out the planning for the communication network 500 as such, and then to divide the outcome of the planning to yield the planning 1100 for the individual one of the cells 10-1, 10-2, ..., 10-N. A person skilled in the art will surely appreciate that in most cases the planning 1100a i.e. the generating of the beam shapes for the relaying and the relaying 1500 into the individual cell on a cell by cell basis will be more convenient, as less computing power is needed in order to optimize the method 5000 of relaying into the communication network 500 on a cell by cell basis. Nevertheless there may be circumstances when global updating is of advantage.

It will be appreciated by a person skilled in the art that all those aspects of the disclosure described herein as an apparatus may at least partly be incorporated as software. The methods as described herein may without limitation be implemented as a computer program and/or a dedicated hardware to carry out the method. Changing from a method to a computer program and/or a dedicated piece of hardware does not depart from the spirit of the disclosure.

While various embodiments of the present disclosure have been described above, it should be understood that they have been presented by way of example, and not limitation. It will be apparent to persons skilled in the relevant arts that various changes in form and detail can be made therein without departing from the scope of the disclosure. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present disclosure may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present disclosure should not be limited by any of the above-described exemplary embodiments, but should be defined only in accordance with the following claims and their equivalents.

The invention claimed is:

1. An Antenna array comprising a plurality of antenna elements for relaying radio signals into a cell of a communication network the antenna array comprising:
   a plurality of uplink beam forming vectors for forming a plurality of uplink beam shapes, wherein an individual one of the plurality of uplink beam forming vectors comprises uplink factors for the antenna elements for creating an individual one of the plurality of uplink beam shapes wherein the uplink factors each comprise an amplitude weighting and at least one of a phase weighting, or a delay that is applied to each individual one of the antenna elements;
   a plurality of downlink beam forming vectors for forming a plurality of downlink beam shapes, wherein an individual one of the plurality of downlink beam forming vectors comprises downlink factors of the antenna elements for creating an individual one of the plurality of downlink beam shapes wherein the downlink factors each comprise an amplitude weighting and at least one of a phase weighting or a delay that is applied to each individual one of the antenna elements;
   a link for receiving at least one of the plurality of uplink beam forming vectors, the plurality of downlink beam forming vectors, the individual one of the plurality of uplink beam forming vectors and the individual one of the plurality of downlink beam forming vectors and
   wherein at least one of the uplink factors of the individual one of the plurality of uplink beam forming vectors and the downlink factors of the individual one of the plurality of downlink beam forming vectors are independently selectable for providing ones of the plurality of different uplink beam shapes different from ones of the plurality of downlink beam shapes different from ones of the plurality of downlink beam shapes, wherein the independent selection is based on a local knowledge of the cell.

2. The antenna array according to claim 1, wherein the individual one of the plurality of uplink beam forming vectors comprises the uplink factors for a subset of the antenna elements.

3. The antenna array according to claim 1, wherein the individual one of the plurality of downlink beam forming vectors comprises the downlink factors for a subset of the antenna elements.

4. The antenna array according to claim 1, wherein the local knowledge about the cell comprises at least one of: a topology of the cell and a distribution of users within the cell.

5. The antenna array according to claim 4, wherein the local knowledge about the cell further comprises at least one of a received signal strength (pu) for the plurality of uplink beam forming vectors (20u), a received signal strength (pd) for the plurality of downlink beam forming vectors, a signal to interference and noise ratio (SINR-u) for the plurality of uplink beam forming vectors, a signal to interference and noise ratio (SINR-d) for the plurality of downlink beam forming vectors, a coverage area for the plurality of uplink beam forming vectors, a coverage area for the plurality of downlink beam forming vectors, a normalised signal to interference ratio (SINR-Nu) with respect to the coverage area for the plurality of uplink beam forming vectors, a normalised signal to interference and noise ratio (SINR-Nd) with respect to the coverage area for the plurality of downlink beam forming vectors, an equivalent isotropically radiated power (EIRP) of the plurality of antenna elements.

6. The antenna array according to claim 1, further comprising a local network planning module for providing the local knowledge about the cell.

7. The antenna array according to claim 6, wherein the local network planning module is forwarding at least one of the plurality of uplink beam forming vectors, the plurality of downlink beam forming vectors, the individual one of the plurality of uplink beam forming vectors and the individual one of the plurality of downlink beam forming vectors to the link.

8. The antenna array according to claim 1 further comprising a local knowledge update module for monitoring and updating the local knowledge about the cell.

9. The antenna array according to claim 1, wherein the individual one of the plurality of uplink beam forming vectors and the individual one of the plurality of downlink beam forming vectors yield beam shapes being substantially identical.

10. The antenna array according claim 1, wherein at least one of the plurality of uplink beam forming vectors and the plurality of downlink beam forming vectors yield beam shapes with varying tilt angles.

11. A communication network comprising:
   a plurality of antenna arrays with a plurality of antenna elements for relaying radio signals into cells of the communication network, each of the antenna arrays comprising:
      a plurality of uplink beam forming vectors, for forming a plurality of uplink beam shapes of an individual antenna array, wherein an individual one of the plurality of uplink beam forming vectors comprises uplink factors for the antenna elements for creating an individual one of the plurality of uplink beam shapes wherein the uplink factors each comprise an amplitude weighting, and at least one of a phase weighting or a delay that is applied to each individual one of the antenna elements;
      a plurality of downlink beam forming vectors, for forming a plurality of downlink beam shapes of the individual antenna array, wherein an individual one of the plurality of downlink beam forming vectors comprises downlink factors for the antenna elements for creating an individual one of the plurality of downlink beam shapes wherein the downlink factors each comprise an amplitude weiqhting and at least one of a phase weighting or a delay that is applied to each individual one of the antenna elements;

a link for receiving at least one of the plurality of uplink beam forming vectors, the plurality of downlink beam forming vectors, the individual one of the plurality of uplink beam forming vectors and the individual one of the plurality of downlink beam forming vectors and a network planning system for independently selecting and forwarding at least one of the uplink factors of the individual one of the plurality of uplink beam forming vectors and the downlink factors for the individual one of the plurality of downlink beam forming vectors for at least one of the antenna arrays for providing ones of the plurality of different uplink beam shapes different from ones of the plurality of downlink beam shapes to at least one the links of the antenna arrays, the independent selection being bases on a local knowledge of the communication network.

12. The communication network according to claim 11, wherein the individual one of the plurality of uplink beam forming vectors comprises the uplink factors for a subset of the antenna elements.

13. The communication network according to claim 11, wherein the individual one of the plurality of downlink beam forming vectors comprises the downlink factors for a subset of the antenna elements.

14. The communication network according to claim 11, wherein the local knowledge about the communication network comprises at least one of: a topology of the cells and a distribution of users within the cells.

15. The communication network according to claim 14, wherein the local knowledge about the communication network for at least one of the plurality of antenna arrays of the communication network comprises at least one of a received signal strength for the plurality of uplink beam forming vectors, a received signal strength (pd-1, pd-2, . . . , pd-N) for the plurality of downlink beam forming vectors, a signal to interference and noise ratio for the plurality of uplink beam forming vectors, a signal to interference and noise ratio for the plurality of downlink beam forming vectors, a coverage area for the plurality of uplink beam forming vectors, a coverage area for the plurality of downlink beam forming vectors, a normalised signal to interference and noise ratio with respect to the coverage area for the plurality of uplink beam forming vectors, a normalised signal to interference and noise ratio with respect to the coverage area for the plurality of downlink beam forming vectors, an equivalent isotropically radiated power (EIRP) of the antenna elements.

16. The communication network according to claim 11, wherein a local knowledge divider module is providing a local knowledge of the cells of the network based on the local knowledge about the network.

17. The communication network according to claim 11, comprising a local knowledge update module for monitoring and updating the local knowledge about the communication network.

18. The communication network according to claim 11, wherein the individual one of the plurality of uplink beam forming vectors and the individual one of the plurality of downlink beam forming vectors both yield substantially identical beam shapes for at least one of the plurality of antenna arrays.

19. The communication network according to claim 11, wherein at least one of the plurality of uplink beam forming vectors and the plurality of downlink beam forming vectors yield beam patterns with varying tilt angles for at least one of the plurality of antenna arrays.

20. The communication network according to claim 11, wherein the individual one of the plurality of uplink beam forming vectors substantially generates a beam shape of a first polarization and the individual one of plurality of downlink beam forming vectors generates a beam shape substantially of a second polarization for at least one of the plurality of antenna arrays.

21. A network planning system for planning a communication network, the communication network comprising:

a plurality of antenna arrays with a plurality of antenna elements for relaying radio signals into cells of the communication network, each of the antenna arrays comprising:

a plurality of uplink beam forming vectors for forming a plurality of uplink beam shapes for an individual one of the antenna arrays, wherein an individual one of the plurality of uplink beam forming vectors comprises uplink factors for the antenna elements for creating an individual one of the plurality of uplink beam shapes wherein the uplink factors each comprise an amplitude weighting and at least one of a phase weighting or a delay that is applied to each individual one of the antenna elements;

a plurality of downlink beam forming vectors for forming a plurality of downlink beam shapes for the individual one of the antenna arrays, wherein an individual one of the plurality of downlink beam shapes comprises downlink factors for the antenna elements for creating an individual one of the plurality of downlink beam shapes wherein the downlink factors each comprise an amplitude weighting and at least one of a phase weighting or a delay that is applied to each individual one of the antenna elements a link for receiving at least one of the plurality of uplink beam forming vectors, the plurality of downlink beam forming vectors, the individual one of the plurality of uplink beam forming vectors and the individual one of the plurality of downlink beam forming vectors;

wherein the network planning system independently selects and forwards at least one of the uplink factors of the individual one of the plurality of uplink beam forming vectors and the downlink factors of the individual one of the plurality of downlink beam forming vectors, for at least one of the plurality of antenna arrays for providing ones of the plurality of different uplink beam shapes different from ones of the plurality of downlink beam shapes to at least one of the links of the antenna arrays, and wherein the independent selection is based on the planning of the communication network.

22. The network planning system according to claim 21, wherein the individual one of the plurality of uplink beam forming vectors comprises the uplink factors for a subset of the antenna elements.

23. The network planning system according to claim 21, wherein the individual one of the plurality of downlink beam forming vectors comprises the downlink factors for a subset of the antenna elements.

24. The network planning system according to claim 21, using a local knowledge about the communication network for selecting the individual one of the plurality of uplink beam forming vectors and the individual one of the plurality of downlink beam forming vectors for at least one of the plurality of antenna arrays.

25. The network planning system according to claim 24, further comprising:
a local knowledge module providing the local knowledge about the communication network.

26. The network planning system according to claim 24, wherein the local knowledge about the communication network for at least one of the antenna arrays of the network comprises at least one of: a topology of the cells of the communication network and a geographical distribution of users within the cells of the communication network.

27. The network planning system according to claim 26, wherein the local knowledge about the communication network for at least one of the antenna arrays of the communication network further comprises at least one of a received signal strength for the plurality of uplink beam forming vectors, a received signal strength for the plurality of downlink beam forming vectors, a signal to interference and noise ratio for the plurality of uplink beam forming vectors, a signal to interference and noise ratio for the plurality of downlink beam forming vectors, a coverage area for the plurality of uplink beam forming vectors, a coverage area for the plurality of downlink beam forming vectors, a normalised signal to interference and noise ratio with respect to the coverage area for the plurality of uplink beam forming vectors, a normalised signal to interference and noise ratio (SINR-Nd1, SINR-Nd2, . . . , SINR-NdN) with respect to the coverage area for the plurality of downlink beam forming vectors, an equivalent isotropically radiated power (EIRP) of the antenna elements.

28. The network planning system according to claim 24, further comprising a local knowledge divider module adapted to provide a local knowledge about the cells of the communication network based on the local knowledge about the communication network.

29. The network planning system according to claim 21, forwarding at least one of the plurality of uplink beam forming vectors, the plurality of downlink beam forming vectors, the individual one of the plurality of uplink beam forming vectors and the individual one of the plurality of downlink beam forming vectors to a link of at least one of the plurality of antenna arrays.

30. The network planning system according to claim 21, further comprising a local knowledge update module for monitoring and updating the local knowledge about the communication network.

31. The network planning system according to claim 21, wherein the individual one of the plurality of uplink beam forming vectors and the individual one of the plurality of downlink beam forming vectors both yield beam shapes being substantially identical for at least one of the plurality of the antenna arrays.

32. The network planning system according to claim 21, wherein at least one of the plurality of uplink beam forming vectors and the plurality of downlink beam forming vectors yield shapes with varying tilt angles for at least one of the plurality of the antenna arrays.

33. The network planning system according to claim 21, wherein the individual one of the plurality of uplink beam forming vectors yields a beam shape substantially being of a first polarization and the individual one of the plurality of downlink beam forming vectors yields a beam shape substantially being of a second polarization for at least one of the plurality of the antenna arrays.

34. A method for generating beam shapes for a relaying of radio signals into a cell of a communication network, the method comprising the steps of:

providing a local knowledge of the cell;
providing a plurality of uplink beam forming vectors for forming a plurality of uplink beam shapes for an antenna array with a plurality of antenna elements, wherein an individual one of the plurality of uplink beam forming vectors comprises uplink factors for the antenna elements for creating an individual one of the plurality of uplink beam shapes wherein the uplink factors each comprise amplitude weighting and at least one of an a phase weighting or a delay that is applied to each individual one of the antenna elements; and
providing a plurality of downlink beam forming vectors adapted to form a plurality of downlink beam shapes, wherein an individual one of the plurality of downlink beam shapes comprises downlink factors for the antenna elements for creating an individual one of the downlink beam shapes wherein the downlink factors each comprise an amplitude weighting and at least one of a phase weighting, or a delay that is applied to each individual one of the antenna elements
selecting at least one of the downlink factors and the uplink factors independently from each other for providing ones of the plurality of uplink beam shapes different from ones of the plurality of downlink beam shapes, the independent selection being based on the knowledge of the cell;
forwarding the selected downlink factors and uplink factors to at least one of the links of the antenna arrays.

35. The method according to claim 34, wherein the individual one of the plurality of uplink beam forming vectors comprises the uplink factors for a subset of the antenna elements.

36. The method according to claim 34, wherein the individual one of the plurality of downlink beam forming vectors comprises the downlink factors for a subset of the antenna elements.

37. The method according to claim 34 further comprising:
selecting an individual one of the plurality of uplink beam forming vectors;
selecting an individual one of the plurality of downlink beam forming vectors;
wherein the selecting of the individual one of the plurality of uplink beam forming vectors is independent from the selecting of the individual one of the plurality of downlink beam forming vectors.

38. A method for relaying radio signals using generated beam shapes into a cell of a communication network, the generated beam shapes being relayed by an antenna array with a plurality of antenna elements, the method comprising the steps of:
generating beam shapes; and
relaying radio signals into the cell by the antenna array using the generated beam shapes,
wherein the generating of beam shapes comprises:
providing a plurality of uplink beam forming vectors for forming a plurality of uplink beam shapes for an antenna array with a plurality of antenna elements, wherein an individual one of the plurality of uplink beam forming vectors comprises uplink factors for the plurality of antenna elements for creating an individual one of the plurality of uplink beam shapes wherein the uplink factors each comprise an amplitude weighting and at least one of a phase weighting, or a delay that is applied to each individual one of the antenna elements; and
providing a plurality of downlink beam forming vectors for forming a plurality of downlink beam shapes, wherein an individual one of the plurality of downlink beam forming vectors comprises downlink factors for the plurality of antenna elements for creating an individual one of the plurality of downlink beam shapes wherein the downlink factors each comprise an amplitude weighting and at least one of a phase weighting or a delay that is applied to each individual one of the antenna elements;

selecting at least one of the downlink factors and the uplink factors independently from each other for providing ones of the plurality of uplink beam shapes different from ones of the plurality of downlink beam shapes, the selecting being based on a local knowledge of a cell;

forwarding the selected downlink factors and uplink factors to at least one of the links of the antenna arrays.

39. The method according to claim 38 further comprising a step of:

monitoring the relaying of radio signals into the cell.

40. The method according to claim 38 further comprising;

checking if an updating of the local knowledge about the cell is required and updating the local knowledge about the cell.

41. The method according to claim 38, wherein the individual one of the plurality of uplink beam forming vectors comprises the uplink factors for a subset of the antenna elements.

42. The method according to claim 38, wherein the individual one of the plurality of downlink beam forming vectors comprises the downlink factors for a subset of the antenna elements.

43. The method according to claim 38, wherein the generating of beam shapes further comprises:

selecting the uplink factors of the individual one of the plurality of uplink beam forming vectors;

selecting the downlink factors of the individual one of the plurality of downlink beam forming vectors;

wherein the selecting of the uplink factors of the individual one of the plurality of uplink beam forming vectors is independent from the selecting of the downlink factors of the individual one of the plurality of downlink beam forming vectors.

44. The method according to claim 38, wherein the step of relaying radio signals into the cell comprises:

applying the selected one of the plurality of uplink beam forming vectors to the antenna array;

applying the selected one of the plurality of downlink beam forming vectors to the antenna array.

45. A method for planning a communication network comprising a plurality of antenna arrays with a plurality of antenna elements for relaying generated radio signals into cells of the communication network, the method comprising:

generating beam shapes for a relaying of radio signals into an individual one of the cells for at least one of the antenna arrays, wherein the step of generating beam shapes for a relaying of radio signals comprises:

providing a plurality of uplink beam forming vectors for forming a plurality of uplink beam shapes for at least an individual one of the plurality of antenna arrays with the plurality of antenna elements, wherein an individual one of the plurality of uplink beam forming vectors comprises uplink factors for the plurality of antenna elements for creating an individual one of the plurality of uplink beam shapes wherein the uplink factors each comprise an amplitude weighting and at least one of a phase weighting or a delay that is applied to each individual one of the antenna elements; and providing a plurality of downlink beam forming vectors for forming a plurality of downlink beam shapes for at least one of the plurality of the antenna arrays with the plurality of antenna elements, wherein an individual one of the plurality of downlink beam forming vectors comprises downlink factors for the plurality of antenna elements for creating an individual one of the plurality of downlink beam shapes wherein the downlink factors each comprise an amplitude weighting and at least one of a phase weighting or a delay that is applied to each individual one of the antenna elements;

selecting at least one of the downlink factors and the uplink factors independently from each other for providing ones of the plurality of uplink beam shapes different from ones of the plurality of downlink beam shapes;

forwarding the selected downlink factors and uplink factors to at least one of the links of the antenna arrays.

46. The method according to claim 45 further comprising a step of:

providing a local knowledge about the communication network.

47. The method according to claim 46 further comprising:

providing a local knowledge about the cells based on the local knowledge about the communication network.

48. The method according to claim 46, further comprising:

checking whether generating beam shapes for a relaying of radio signals for further cells is required and generating beam shapes for a relaying of radio signals for the further cells.

49. The method according to claim 48, wherein the individual one of the plurality of uplink beam forming vectors comprises the uplink factors for a subset of the antenna elements.

50. The method according to claim 48, wherein the individual one of the plurality of downlink beam forming vectors comprises the downlink factors for a subset of the antenna elements.

51. The method according to claim 48, wherein the step of generating beam shapes for a relaying of radio signals comprises:

selecting the individual one of the plurality of uplink beam forming vectors for at least one of the plurality of antenna arrays with the plurality of antenna elements;

selecting the individual one of the plurality of downlink beam forming vectors for at least one of the plurality of antenna arrays with the plurality of antenna elements;

forwarding the selected downlink factors and uplink factors to at least one of the links of the antenna arrays wherein the selecting of the individual one of the plurality of uplink beam forming vectors for at least one of the plurality of antenna arrays with the plurality of antenna elements is independent from the selecting of the individual one of the plurality of downlink beam forming vectors for the at least one of the plurality of antenna arrays.

52. The method according to claim 46, wherein the step of generating beam shapes for a relaying of radio signals further comprises:

checking if an updating of the local knowledge about the cells is required and updating the local knowledge about the cells.

53. The method according to claim 52, further comprising:

checking if the updating of the local knowledge about the cells was carried out; and updating the local knowledge about the communication network.

54. A method for relaying radio signal using generated beam shapes into cells of a communication network comprising a plurality of antenna arrays with a plurality of antenna elements, the method comprising the steps:

providing a local knowledge about the communication network generating beam shapes for a relaying of radio signals into an individual one of the cells for at least one of the antenna arrays;

relaying radio signals into the individual one of the cells by the at least one of the antenna arrays, wherein the step of generating beam shapes for a relaying of radio signals comprises:

providing a plurality of uplink beam forming vectors adapted to form a plurality of uplink beam shapes for at least an individual one of the plurality of antenna arrays with the plurality of antenna elements, wherein an individual one of the plurality of uplink beam forming vectors comprises uplink factors for the antenna elements for creating an individual one of the plurality of uplink beam shapes wherein the uplink factors each comprise an amplitude weighting and at least one of a phase weighting or a delay that is applied to each individual one of the antenna elements; and providing a plurality of downlink beam forming vectors adapted to form a plurality of downlink beam shapes for at least one of the plurality of the antenna arrays with the plurality of antenna elements, wherein an individual one of the plurality of downlink beam forming vectors comprises downlink factors for the antenna elements for creating an individual one of the plurality of uplink beam shapes wherein the downlink factors each comprise an amplitude weighting and at least one of a phase weighting or a delay that is applied to each individual one of the antenna elements;

wherein at least one of the downlink factors and the uplink factors are independently selected for providing ones of the plurality of different uplink beam shapes different from ones of the plurality of and downlink beam shapes, the independent selection being based on the local knowledge forwarding the selected downlink factors and uplink factors to at least one of the antenna arrays.

55. The method according to claim 54 further comprising: dividing the local knowledge about the communication network into a local knowledge about the cells.

56. The method according to claim 54, wherein the individual one of the plurality of uplink beam forming vectors comprises the uplink factors for a subset of the antenna elements.

57. The method according to claim 54, wherein the individual one of the plurality of downlink beam forming vectors comprises the downlink factors for a subset of the antenna elements.

58. The method according to claim 54, wherein the step of generating beam shapes for a relaying of radio signals further comprises:

selecting the individual one of the plurality of uplink beam forming vectors for at least one of the antenna arrays with the plurality of the antenna elements;

selecting the individual one of the plurality of downlink beam forming vectors for at least one of the antenna arrays;

wherein the controlling of the individual one of the plurality of uplink beam forming vectors for at least one of the antenna arrays is independent from the selecting of the individual one of the plurality of downlink beam forming vectors for the at least one of the antenna arrays with the plurality of antenna elements.

59. The method according to claim 54, further comprising: checking if an updating of the local knowledge about the cells is required and updating the local knowledge about the cells.

60. The method according to claim 54, further comprising: checking if an updating of local knowledge about the cells was carried out; and updating the local knowledge about the communication network.

61. The method according to claim 54, wherein the step of relaying of radio signals into the cells comprises:

applying the uplink factors of the selected one of the plurality of uplink beam forming vectors to at least one of the the antenna arrays (with the plurality of antenna elements;

applying the downlink factors of the selected one of the plurality downlink beam forming vectors to at least one of the antenna arrays with the plurality of antenna elements.

62. Computer program product embodied on a non-transitory computer-readable medium and the computer-readable medium comprising executable instructions for a manufacture of an antenna array with a plurality of antenna elements for relaying radio signals into a cell of a communication network; the antenna array comprising:

a plurality of uplink beam forming vectors for forming a plurality of uplink beam shapes, wherein an individual one of the plurality of uplink beam forming vectors comprises uplink factors for the antenna elements for creating an individual one of the plurality of uplink beam shapes wherein the uplink factors each comprise an amplitude weighting and at least one of a phase weighting or a delay that is applied to each individual one of the antenna elements;

a plurality of downlink beam forming vectors for forming a plurality of downlink beam shapes, wherein an individual one of the plurality of downlink beam forming vectors comprises downlink factors for the antenna elements for creating an individual one of the plurality of downlink beam shapes wherein the downlink factors each comprise an amplitude weighting, at least one of a phase weighting, or a delay that is applied to each individual one of the antenna elements; and wherein at least one of the uplink factors of the individual one of the plurality of uplink beam forming vectors and the downlink factors of the individual one of the plurality of downlink beam forming vectors are independently selected for providing ones of the plurality of different uplink beam shapes different from ones of the plurality of downlink beam shapes, the independent selection being based on a local knowledge of the cell; and wherein the at least one of the uplink factors and at least one of the downlink factors are forwarded to at least one of the antenna arrays.

63. Computer program product embodied on a non-transitory computer-readable medium and the computer-readable medium comprising executable instructions for the execution of a manufacture of a network planning system for planning a communication network, the communication network comprising:

a plurality of antenna arrays with the plurality of antenna elements for relaying radio signals into cells of the communication network, each of the antenna arrays comprising:

a plurality of uplink beam forming vectors for forming a plurality of uplink beam shapes for an individual one of the antenna arrays, wherein an individual one of the plurality of uplink beam forming vectors comprises uplink factors for the antenna elements for creating an individual one of the plurality of uplink beam shapes wherein the uplink factors each comprise an amplitude weighting and at least one of a phase weighting or a delay that is applied to each individual one of the antenna elements;

a plurality of downlink beam forming vectors for forming a plurality of downlink beam shapes for the individual one of the antenna arrays, wherein an individual one of the plurality of downlink beam forming vectors comprises downlink factors for the antenna elements for creating an individual one of the plurality of downlink beam shapes wherein the downlink factors each comprise an amplitude weighting and at least one of a phase weighting or a delay that is applied to each individual one of the antenna elements;

wherein the network planning system is adapted to independently select at least one of the uplink factors of the individual one of the plurality of uplink beam forming vectors and the downlink factors of the individual one of the plurality of downlink beam forming vectors, for at least one of the plurality of antenna arrays, for providing ones of the plurality of different uplink beam shapes different from ones of the plurality of downlink beam shapes and forwarding the at least one of the uplink factors and at least one of the downlink factors to at least one of the antenna arrays.

64. Computer program product embodied on a non-transitory computer-readable medium and the computer-readable medium comprising executable instructions for the execution of a method for generating beam shapes for a relaying of radio signals into a cell of a communication network, the method comprising the steps of:

providing a plurality of uplink beam forming vectors for forming a plurality of uplink beam shapes for an antenna array with a plurality of antenna elements, wherein an individual one of the plurality of uplink beam forming vectors comprises uplink factors for the antenna elements for creating an individual one of the plurality of uplink beam shapes wherein the uplink factors each comprise an amplitude weighting and at least one of a phase weighting or a delay that is applied to each individual one of the antenna elements; and providing a plurality of downlink beam forming vectors for forming a plurality of downlink beam shapes, wherein an individual one of the plurality of downlink beam forming vectors comprises downlink factors for the antenna elements for creating an individual one of the plurality of downlink beam shapes wherein the downlink factors each comprise an amplitude weighting and at least one of a phase weighting or a delay that is applied to each individual one of the antenna elements;

wherein at least one of the downlink factors and the uplink factors are independently selected for providing ones of the plurality of different uplink beam shapes different from ones of the plurality of downlink beam shapes and wherein at least one of the uplink factors and at least one of the downlink factors are forwarded to at least one of the antenna arrays, wherein the independent selection is based on a local knowledge of the communication network.

65. Computer program product embodied on a non-transitory computer-readable medium and the computer-readable medium comprising executable instructions for the execution of a method for relaying radio signals using generated beam shapes into a cell of a communication network, the method comprising the steps of:

generating beam shapes; and relaying radio signals using the generated beam shapes into the cell, wherein the step of generating beam shapes comprises:

providing a plurality of uplink beam forming vectors for forming a plurality of uplink beam shapes for an antenna array with a plurality of antenna elements, wherein an individual one of the plurality of uplink beam forming vectors comprises uplink factors for the antenna elements for creating an individual one of the plurality of uplink beam shapes wherein the uplink factors each comprise at least one of an amplitude weighting, a phase weighting, or a delay that is applied to each individual one of the antenna elements; and providing a plurality of downlink beam forming vectors for forming a plurality of downlink beam shapes, wherein an individual one of the plurality of downlink beam shapes comprises downlink factors for the antenna elements for creating an individual one of the downlink beam shapes wherein the downlink factors each comprise at least one of an amplitude weighting, a phase weighting, or a delay that is applied to each individual one of the antenna elements;

wherein at least one of downlink factors and the uplink factors are independently selected for providing ones of the plurality of different uplink beam shapes different from ones of the plurality of downlink beam shapes, the independent selection being based on a local knowledge in a cell; and wherein at least one of the uplink factors and at least one of the downlink factors are forwarded to at least one of the antenna arrays.

66. Computer program product embodied on a non-transitory computer-readable medium and the computer-readable medium comprising executable instructions for the execution of a method for planning a communication network comprising a plurality of antenna arrays with a plurality of antenna elements for relaying radio signals into cells of the communication network, the method comprising:

generating beam shapes for a relaying of radio signals into an individual one of the cells for at least one of the antenna arrays, wherein the step of generating beam shapes comprises:

providing a plurality of uplink beam forming vectors for forming a plurality of uplink beam shapes for at least an individual one of the plurality of antenna arrays with the plurality of antenna elements, wherein an individual one of the plurality of uplink beam forming vectors comprises uplink factors for the plurality of the antenna elements for creating an individual one of the plurality of uplink beam shapes wherein the uplink factors each comprise an amplitude weighting and at least one of a phase weighting or a delay that is applied to each individual one of the antenna elements; and providing a plurality of downlink beam forming vectors for forming a plurality of downlink beam shapes for at least one of the plurality of the antenna arrays with the plurality of antenna elements, wherein an individual one of the plurality of downlink beam forming vectors comprises downlink factors for the plurality of the antenna elements for creating an individual one of the plurality of downlink beam shapes wherein the downlink factors each comprise an amplitude weighting and at least one of a phase weighting, or a delay that is applied to each individual one of the antenna elements;

wherein at least one of downlink factors and the uplink factors are independently selected for at least one of the antenna arrays for providing ones of the plurality of uplink beam shapes different from ones of the plurality of downlink beam shapes, the independent selection being based on a local knowledge of the cell; and wherein at least one of the uplink factors and at least one of the downlink factors are forwarded to at least one of the antenna arrays.

67. Computer program product embodied on a non-transitory computer-readable medium and the computer-readable medium comprising executable instructions for the execution of a method for relaying radio signal using generated beam shapes into cells of a communication network, the communication network comprising a plurality of antenna arrays with a plurality of antenna elements, the method comprising the steps:

providing a local knowledge about the communication network;

generating beam shapes for a relaying of radio signals into an individual one of the cells for at least one of the antenna arrays;

relaying radio signals into the individual one of the cells by the at least one of the antenna arrays, wherein the step of generating beam shapes comprises:

providing a plurality of uplink beam forming vectors for forming a plurality of uplink beam shapes for at least an individual one of the plurality of antenna arrays with the plurality of antenna elements, wherein an individual one of the plurality of uplink beam forming vectors comprises uplink factors for the plurality of the antenna elements for creating an individual one of the plurality of uplink beam shapes wherein the uplink factors each comprise an amplitude weighting and at least one of a phase weighting or a delay that is applied to each individual one of the antenna elements; and providing a plurality of downlink beam forming vectors for forming a plurality of downlink beam shapes for at least one of the plurality of the antenna arrays with the plurality of antenna elements, wherein an individual one of the plurality of downlink beam forming vectors comprises downlink factors for the plurality of the antenna elements for creating an individual one of the plurality of downlink beam shapes wherein the downlink factors each comprise an amplitude weighting and at least one of a phase weighting or a delay that is applied to each individual one of the antenna elements;

wherein at least one of downlink factors and the uplink factors are independently selected for at least one of the antenna arrays for providing ones of the plurality of uplink beam shapes different from ones of the plurality of downlink beam shapes, the independent selection being based on a local knowledge of the cell; and wherein at least one of the uplink factors and at least one of the downlink factors are forwarded to at least one of the antenna arrays.

* * * * *

UNITED STATES PATENT AND TRADEMARK OFFICE
CERTIFICATE OF CORRECTION

PATENT NO. : 8,977,309 B2  
APPLICATION NO. : 12/563693  
DATED : March 10, 2015  
INVENTOR(S) : Georg Schmidt et al.

It is certified that error appears in the above-identified patent and that said Letters Patent is hereby corrected as shown below:

In the Specification

Column 2, line 21, "U.S. Pat. No. 6,682,434"

should read -- U.S. Pat. No. 6,282,434 --.

Signed and Sealed this  
Twenty-eighth Day of July, 2015

Michelle K. Lee  
*Director of the United States Patent and Trademark Office*